US008941660B2

(12) United States Patent
Ishibashi

(10) Patent No.: US 8,941,660 B2
(45) Date of Patent: Jan. 27, 2015

(54) IMAGE GENERATING APPARATUS, IMAGE GENERATING METHOD, AND IMAGE GENERATING INTEGRATED CIRCUIT

(75) Inventor: Yudai Ishibashi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 210 days.

(21) Appl. No.: 13/142,460

(22) PCT Filed: Jun. 15, 2010

(86) PCT No.: PCT/JP2010/003952
§ 371 (c)(1),
(2), (4) Date: Jun. 28, 2011

(87) PCT Pub. No.: WO2010/146828
PCT Pub. Date: Dec. 23, 2010

(65) Prior Publication Data
US 2011/0267354 A1 Nov. 3, 2011

(30) Foreign Application Priority Data

Jun. 17, 2009 (JP) ................................ 2009-143846

(51) Int. Cl.
*G06T 11/20* (2006.01)
*G06T 1/60* (2006.01)
(Continued)

(52) U.S. Cl.
CPC ............... *G06T 15/005* (2013.01); *G06T 1/20* (2013.01); *G09G 5/363* (2013.01); *G06T 11/40* (2013.01); *G09G 2360/121* (2013.01)
USPC .......................................... 345/441; 345/531

(58) Field of Classification Search
CPC ........ G06T 11/40; G06T 11/203; G06T 17/00
See application file for complete search history.

(56) References Cited

U.S. PATENT DOCUMENTS 5,587,800 A    12/1996  Miyazaki
5,692,163 A    11/1997  Fukushima
(Continued)

FOREIGN PATENT DOCUMENTS

CN    1377013     10/2002
JP    5-270093    10/1993
(Continued)

OTHER PUBLICATIONS

International Search Report issued Aug. 24, 2010 in International (PCT) Application No. PCT/JP2010/003952.
(Continued)

*Primary Examiner* — Devona Faulk
*Assistant Examiner* — Tapas Mazumder
(74) *Attorney, Agent, or Firm* — Wenderoth, Lind & Ponack, L.L.P.

(57) ABSTRACT

An image generating apparatus, which can reduce a calculation amount by effectively utilizing a cache resource, generates a graphics image by rendering a polygon and includes a coordinate processing unit loading, from a memory, coordinate data included in vertex data and performing coordinate transform on the loaded coordinate data. The image generating apparatus also includes a determining unit determining whether or not the vertex is a rendering object, using the transformed coordinate data, a shape data cache storing shape data, a shape data processing unit loading, from the memory, the shape data, and storing the loaded shape data in the shape data cache when both of following conditions are satisfied: the vertex is determined to be the rendering object; and the shape data is not yet stored in the shape data cache, and a polygon rendering processing unit rendering the polygon using the transformed coordinate data and the shape data.

7 Claims, 13 Drawing Sheets

(51) Int. Cl.
*G06T 15/00* (2011.01)
*G06T 1/20* (2006.01)
*G09G 5/36* (2006.01)
*G06T 11/40* (2006.01)

(56) References Cited

U.S. PATENT DOCUMENTS

| | | | |
|---|---|---|---|
| 5,933,844 A * | 8/1999 | Young | 711/3 |
| 6,437,779 B1 * | 8/2002 | Saito et al. | 345/420 |
| 7,551,182 B2 * | 6/2009 | Bethune et al. | 345/619 |
| 2004/0233208 A1 * | 11/2004 | Hussain | 345/557 |
| 2007/0050641 A1 * | 3/2007 | Flynn et al. | 713/189 |
| 2009/0324039 A1 * | 12/2009 | Miyaguchi | 382/131 |
| 2010/0030968 A1 * | 2/2010 | Pasch et al. | 711/125 |
| 2010/0066739 A1 | 3/2010 | Ishibashi | |

FOREIGN PATENT DOCUMENTS

| | | |
|---|---|---|
| JP | 7-295787 | 11/1995 |
| WO | 2008/126392 | 10/2008 |

OTHER PUBLICATIONS

English translation of Reply to Written Opinion (Aug. 2010).

* cited by examiner

Fig. 8

| Entry number | Vertex ID (cache tag) | Reference counter | Cache line validity flag | Cache line memory |
|---|---|---|---|---|
| 0 | V0 | 2 | T | Transformed coordinate data D0 at vertex V0 |
| 1 | V1 | 2 | T | Transformed coordinate data D1 at vertex V1 |
| 2 | V2 | 6 | T | Transformed coordinate data D2 at vertex V2 |
| 3 | V3 | 2 | T | Transformed coordinate data D3 at vertex V3 |
| 4 | V4 | 2 | T | Transformed coordinate data D4 at vertex V4 |
| 5 | V5 | 2 | T | Transformed coordinate data D5 at vertex V5 |
| 6 | V6 | 2 | T | Transformed coordinate data D6 at vertex V6 |
| ... | ... | ... | ... | ... |

140

| Entry number | Vertex ID (cache tag) | Reference counter | Cache line validity flag | Cache line memory |
|---|---|---|---|---|
| 0 | V0 | 2 | T | Modified coordinate data M0 at vertex V0 |
| 1 | V1 | 1 | T | Modified coordinate data M1 at vertex V1 |
| 2 | V2 | 3 | T | Modified coordinate data M2 at vertex V2 |
| 3 | V5 | 2 | T | Modified coordinate data M5 at vertex V5 |
| 4 | V6 | 1 | T | Modified coordinate data M6 at vertex V6 |
| 5 | | 0 | F | |
| 6 | | 0 | F | |
| ... | | ... | ... | ... |

170

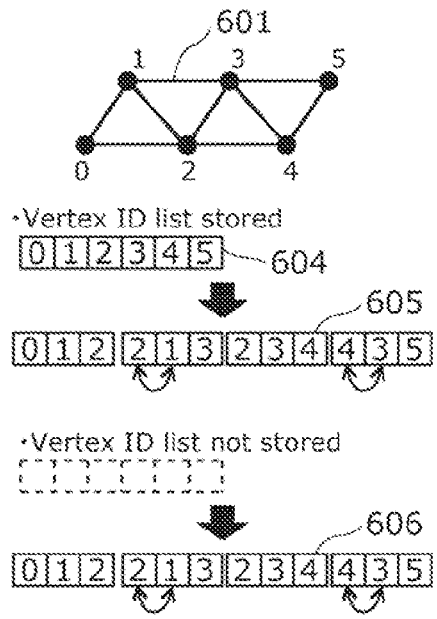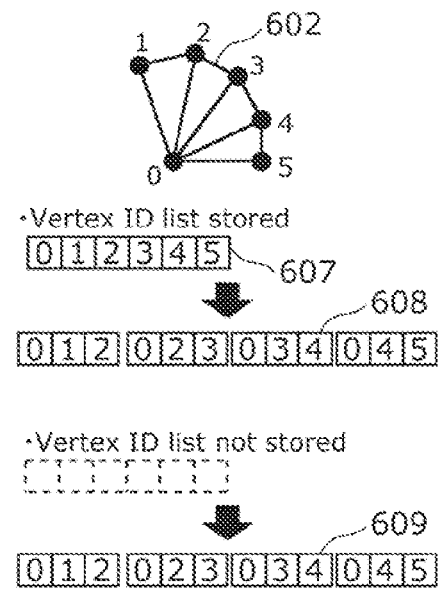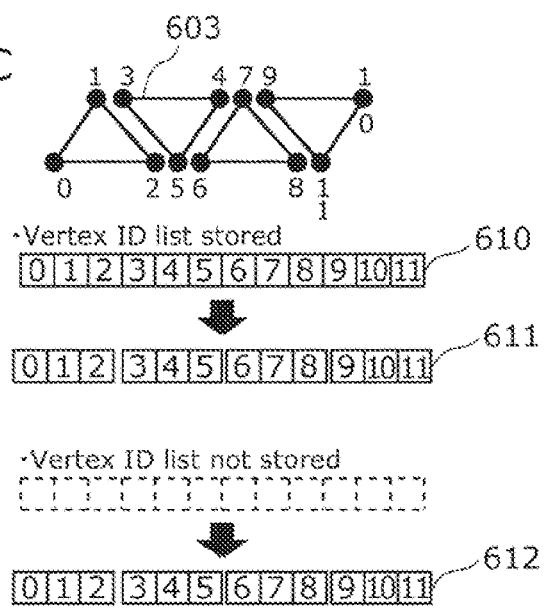

United States Patent US 8,941,660 B2

IMAGE GENERATING APPARATUS, IMAGE GENERATING METHOD, AND IMAGE GENERATING INTEGRATED CIRCUIT

TECHNICAL FIELD

The present invention relates to computer graphics techniques, and to image generating techniques for generating computer graphics images.

BACKGROUND ART

Processing for generating a CG (Computer Graphics) image requires a large amount of calculation load. For this reason, an information processing apparatus which performs image generation processing in real time includes, separately from a CPU (Central Processing Unit), an image generating apparatus (a graphics processing unit) which exclusively performs image generation processing.

FIG. 1 is a flowchart indicating processes of an image generating method performed by a conventional general image generating apparatus.

The conventional general image generating apparatus first loads vertex data of each of input polygon models from an information storage device (memory) (S101). It is to be noted that the vertex data includes coordinate data indicating the positions of the vertices of each of the input polygon models, and shape data that is data other than the coordinate data. Next, the image generating apparatus performs processing for transforming the coordinates of the coordinate data in the vertex data into world coordinates, and further performs processing for transforming the world coordinates to display coordinates (S102).

Next, for each polygon composed of loaded vertex data, the image generating apparatus makes, based on the transformed coordinate data, either a clipping determination on whether or not each polygon is within a visible space or a culling determination on whether or not each polygon shows its surface that should be displayed when viewed from a view point, and thereby makes a determination on whether or not the rendering of the polygon is valid (S103). The image generating apparatus modifies data (shape data) that is other than the coordinate data in the loaded vertex data of only the polygon(s) for which the rendering is already determined to be valid (S104).

Next, the image generating apparatus performs polygon rendering processing using the modified vertex data (S105). The image generating apparatus determines whether or not the aforementioned processing is already completed for all the polygons (S106). When determining that the processing is not yet completed ("Repeat" in S106), the image generating apparatus repeats the respective processes (S101 to S105). When determining that the processing is already completed ("Completion" in S106), the image generating apparatus outputs a rendered image (S107).

A conventional general image generating method is intended to process shape data after processing coordinate data as described above. When vertex data composed of a set of coordinate data and shape data as described above is used, there is a need to load the whole vertex data that is both the coordinate data and the shape data even when only the coordinate data is to be processed. Accordingly, the image generating method entails a problem that the shape data that is unnecessary in such a case is unnecessarily loaded. Likewise, even when the shape data is to be processed, the whole vertex data is unnecessarily loaded. Accordingly, the image generating method entails a problem that the coordinate data that is unnecessary in this case is unnecessarily loaded.

In view of this, PTL (Patent Literature) 1 discloses a technique for separately managing coordinate data and shape data. This makes it possible to prevent either the shape data or the coordinate data from being unnecessarily loaded.

CITATION LIST

Patent Literature

[PTL 1]
PCT International Publication No. 2008/126392

SUMMARY OF INVENTION

Technical Problem

However, PTL 1 entails a problem that it is impossible to sufficiently reduce the amount of memory access and/or a calculation amount. For example, it is possible to reduce the amount of memory access and/or the calculation amount by preventing the loading and calculation of the same data from being executed more than once and thereby effectively utilizing a cache memory. However, PTL 1 fails to disclose a shape data cache for storing such shape data. Without efficiently utilizing such a shape data cache, it is impossible to effectively utilize the resource of the shape data cache.

In view of this, the present invention has an object to provide an image generating apparatus, an image generating method, and an image generating integrated circuit for making it possible to reduce the amount of memory access and/or a calculation amount by effectively utilizing a resource of a shape data cache.

Solution to Problem

In order to achieve the aforementioned object, an image generating apparatus which generates a graphics image by rendering a polygon, the image generating apparatus including: a coordinate processing unit configured to load, from a memory, coordinate data indicating a position of a vertex of the polygon and perform coordinate transform on the loaded coordinate data to generate transformed coordinate data, the coordinate data being included in vertex data that indicates information of the vertex; a determining unit configured to determine whether or not the vertex indicated by the transformed coordinate data is a rendering object, using the transformed coordinate data generated by the coordinate processing unit; a shape data cache for storing shape data that is included in the vertex data to and other than the coordinate data; a shape data processing unit configured to load, from the memory, the shape data of the vertex indicated by the transformed coordinate data, and store the loaded shape data of the vertex in the shape data cache when both of following conditions are satisfied: the determining unit determines that the vertex is the rendering object; and the shape data of the vertex is not yet stored in the shape data cache; and a polygon rendering processing unit configured to render the polygon using the transformed coordinate data generated by the coordinate processing unit and the shape data stored in the shape data cache.

In this way, only the shape data of the vertex determined to be necessary for the rendering of the polygon is stored in the shape data cache, and thus the shape data of vertex unnecessary for the rendering is not required to be stored in the cache. Accordingly, it is possible to effectively utilize the resource of the shape data cache.

In addition, modified shape data generated by modifying the shape data may be stored in the shape data cache, and the shape data processing unit may include: a shape data check unit configured to judge whether or not the modified shape data of the vertex determined to be the rendering object by the determining unit is already stored in the shape data cache; a shape data loading unit configured to load the shape data of the vertex from the memory when the shape data check unit judges that the modified shape data is not yet stored; and a shape data modifying unit configured to modify the shape data loaded by the shape data loading unit to generate the modified shape data, and store the resulting modified shape data into the shape data cache.

In this way, the modified shape data is stored in the shape data cache. This prevents loading of the same shape data and processing for generating same modified shape data from being executed more than once. Therefore, it is possible to reduce the amount of memory access and the calculation amount.

In addition, the determining unit may be configured to generate a rendering vertex list indicating only the vertex determined to be the rendering object, and the shape data check unit may be configured to judge whether or not the modified shape data of the vertex indicated in the rendering vertex list generated by the determining unit is already stored in the shape data cache.

In this way, it is only necessary that the shape data of the vertex indicated in the rendering vertex list is loaded. Thus, it is possible to simplify the determination on whether or not to load the shape data.

In addition, the image generating apparatus may further include a coordinate data cache for storing transformed coordinate data generated by the coordinate processing unit, wherein the determining unit may be configured to determine whether or not the vertex indicated by the transformed coordinate data is the rendering object, using the transformed coordinate data stored in the coordinate data cache, when the transformed coordinate data is already stored in the coordinate data cache.

In this way, by storing the transformed coordinate data in the cache, it is possible to prevent the loading of the same coordinate data and the processing for generating same transformed coordinate data from being executed more than once, and thereby making it possible to reduce the amount of memory access and the calculation amount.

It is to be noted that the present invention can be implemented not only as an image generating apparatus, but also as a method including the steps corresponding to the processing units of the image generating apparatus. Furthermore, the present invention may be implemented as a program causing a computer to execute these steps. Furthermore, the present invention may be implemented as recording media such as a computer-readable CD-ROM (Compact Disc-Read Only Memory) having the program recorded thereon, and also as information, data and/or a signal representing the program. These program, information, data and signal may be distributed through communication networks such as the Internet.

Furthermore, some or all of the structural elements of each of the above-described image generating apparatuses may be configured in a single system LSI (Large Scale Integration). The system LSI is a super-multi-functional LSI manufactured by integrating plural structural units on a single chip. More specifically, the system LSI is a computer system configured to include a microprocessor, a ROM, a RAM (Random Access Memory), etc.

Advantageous Effects of Invention

The image generating apparatus according to the present invention can provide an advantageous effect of being able to effectively utilize a shape data cache because the image generating apparatus does not need to store shape data of vertices which are of a polygon and not required for rendering the polygon into a cache.

BRIEF DESCRIPTION OF DRAWINGS

FIG. 8 is a diagram showing an exemplary structure of each of a transformed coordinate data cache and a modified shape data cache according to the embodiment.

FIG. 10A is a diagram showing an example of data transform in the case of applying the image generating apparatus according to the embodiment to polygon rendering in a polygon strip method.

FIG. 10B is a diagram showing an example of data transform in the case of applying the image generating apparatus according to the embodiment to polygon rendering in a polygon fan method.

FIG. 10C is a diagram showing an example of data transform in the case of applying the image generating apparatus according to the embodiment to polygon rendering in an independent polygon method.

DESCRIPTION OF EMBODIMENT

Embodiment

Hereinafter, an image generating apparatus and an image generating method according to an embodiment of the present invention will be described with reference to the drawings.

An image generating apparatus according to this embodiment of the present invention determines whether or not each of the vertices of each of one or more polygons is necessary for rendering the polygon, and judges whether or not modified shape data of only the vertices determined to be necessary is already stored in a shape data cache. When the shape data is not yet stored in the shape data cache, the image generating apparatus loads the shape data from a memory, processes the loaded shape data to generate modified shape data, and stores the modified shape data in the shape data cache. When the shape data is already stored in the shape data cache, the image generating apparatus renders the polygon using the modified shape data stored in the shape data cache.

In other words, by storing the modified shape data of only the vertices determined to be necessary for rendering the polygon into the cache, it is possible to provide an advantageous effect of being able to effectively utilize the resource of the shape data cache.

Next, a description is given of a structure of the image generating apparatus according to this embodiment of the present invention.

Figure 1:
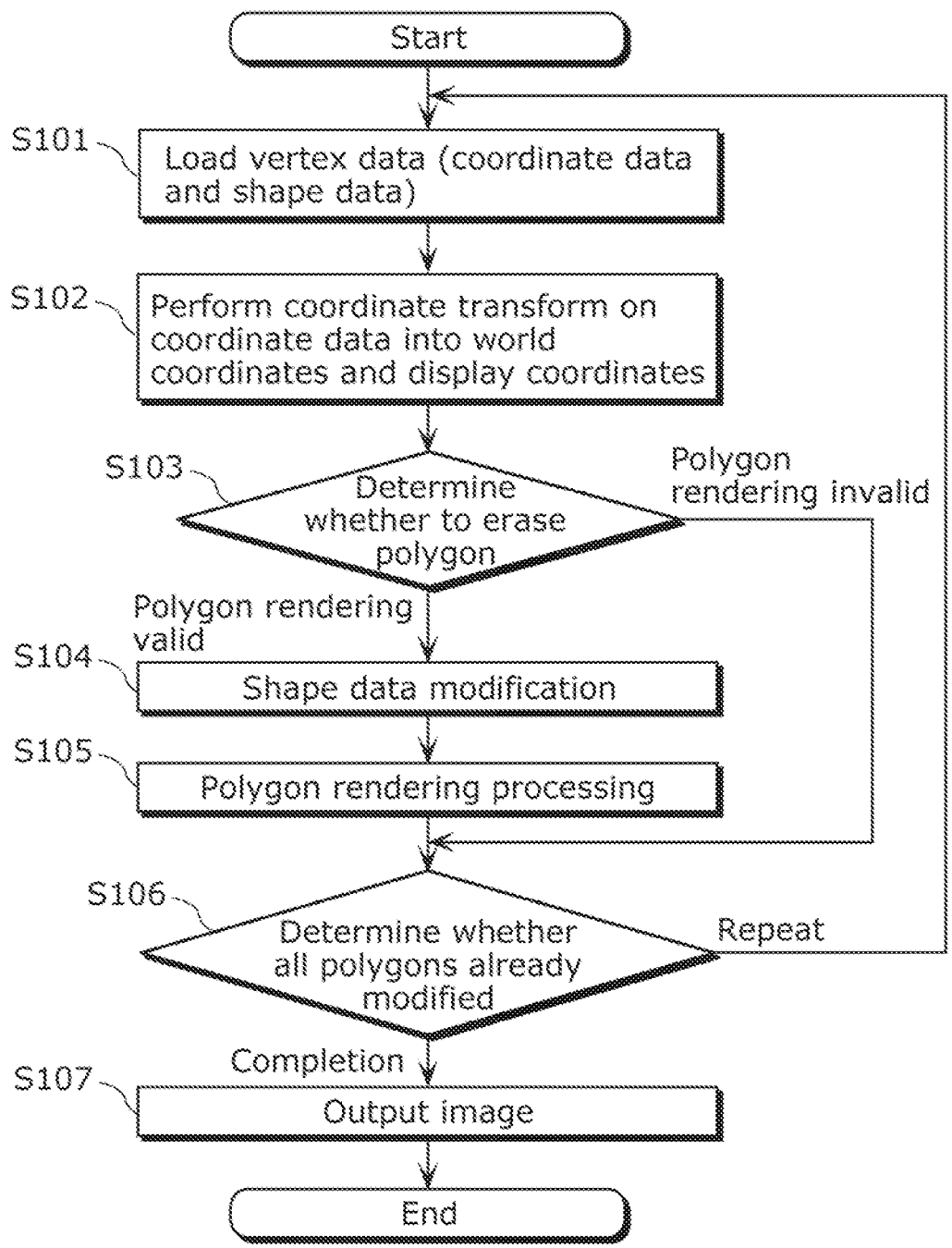
FIG. 1 is a flowchart indicating operations performed by a conventional image generating apparatus.
Figure 2:
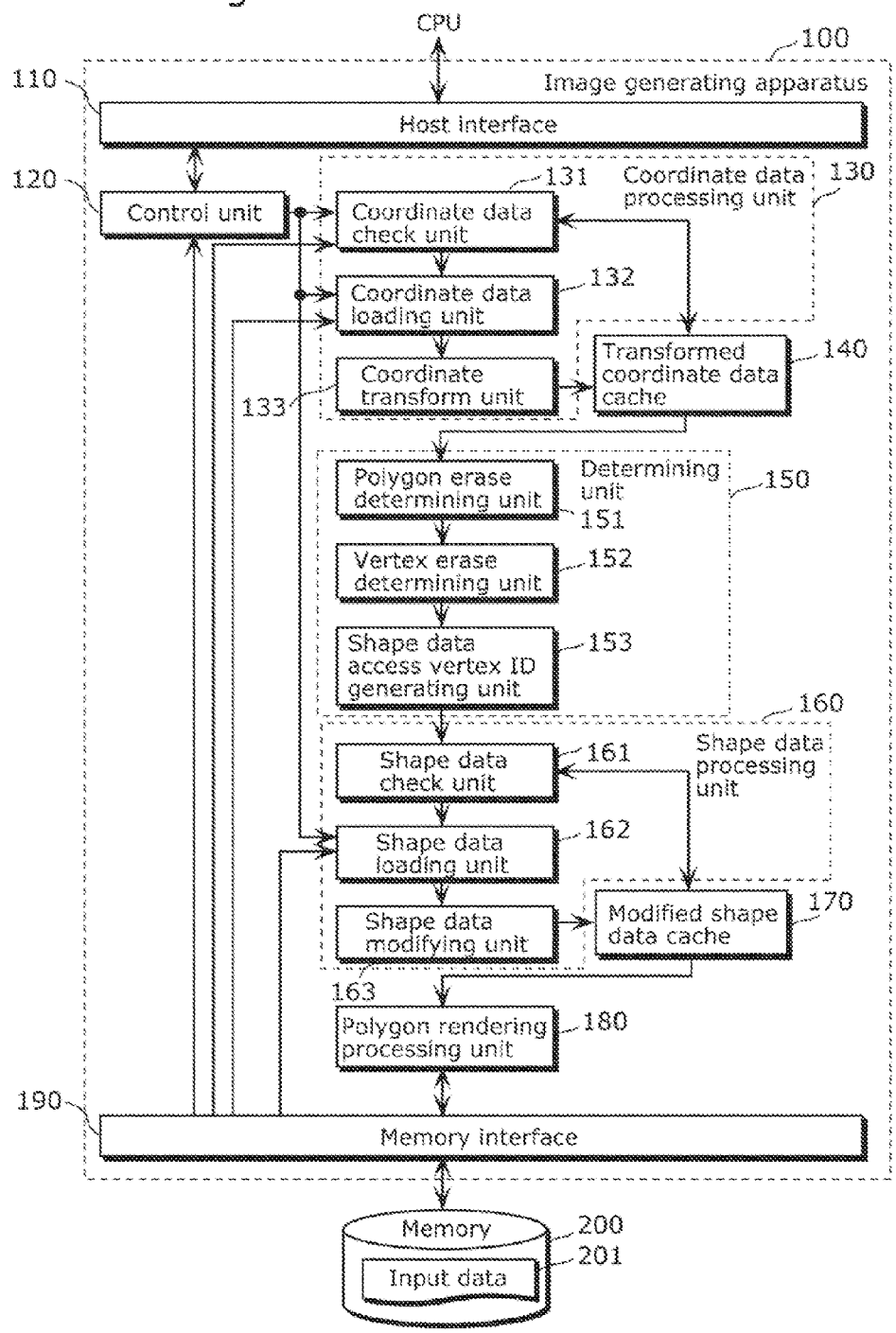
FIG. 2 is a block diagram of an exemplary structure of an image generating apparatus according to an embodiment of the present invention.

FIG. 2 is a block diagram of an exemplary structure of an image generating apparatus 100 according to this embodiment. The image generating apparatus 100 in the diagram is an apparatus intended to, generate a graphics image by rendering the polygon. More specifically, the image generating apparatus 100 executes the polygon rendering by reading out (loading) necessary data from a memory 200 in which input data 201 relating to the polygon rendering is stored. First, a description is given of the input data 201 stored in the memory 200.

Figure 3:
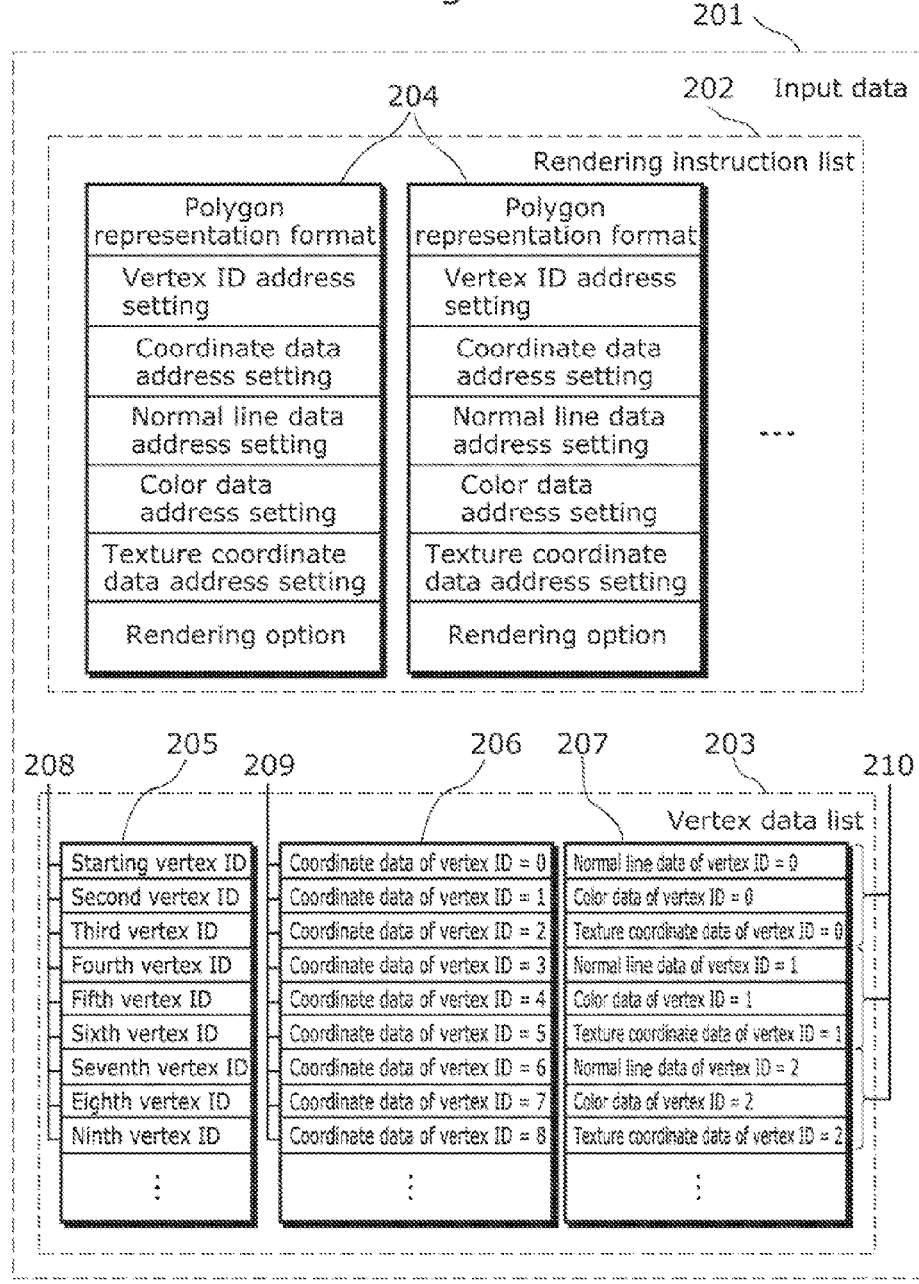
FIG. 3 is a diagram showing an example of input data that is input to the image generating apparatus according to the embodiment.

FIG. 3 is a diagram showing an example of the input data 201 that is input to the image generating apparatus 100 according to this embodiment. As shown in the diagram, the input data 201 is composed of a rendering instruction list 202, and a vertex data list 203 for the input polygon models.

The rendering instruction list 202 includes a rendering instruction 204 indicating various kinds of information relating to the polygon rendering instruction. As shown in FIG. 3, the rendering instruction 204 indicates: representation formats of the input polygons (examples of the representation formats include a polygon strip, a polygon fan, a polygon mesh, an independent polygon, etc.); setting for loading each of parameters (address setting for various kinds of data); rendering options; and the like.

The vertex data list 203 is a list of vertex data of the respective input polygon models, and is composed of a vertex ID list 205, a coordinate data list 206, and a shape data list 207. It is to be noted that the vertex data is data indicating information about a vertex of a polygon and is composed of the coordinate data and the shape data. The coordinate data is data indicating the position of the vertex. The shape data is data other than the coordinate data in the vertex data.

As shown in FIG. 3, the vertex data list 203 may be divided into the vertex ID list 205, the coordinate data list 206, and the shape data list 207, and the respective lists may be stored in separate memory areas. In this way, it is possible to prevent the loading of the shape data determined to be unnecessary from being loaded together with the coordinate data when burst memory access is made to load the vertex data list 203, and thereby to make it possible to increase the memory access efficiency. Here, the burst memory access is for loading a large number of data items in areas having consecutive memory addresses collectively in one-time memory access.

The vertex ID list 205 is a list of pieces of vertex ID 208 each indicating the ID of the corresponding one of the vertices of the input polygon models. Each piece of the vertex ID 208 is ID associating the coordinate data and the shape data of the corresponding one of the vertices. Accordingly, the coordinate data and shape data are generated for each piece of the vertex ID 208 for the corresponding one of the vertices. The vertex ID 208 is stored at the position indicated by either a pointer or an address indicated by vertex ID address setting of the rendering instruction 204.

The coordinate data list 206 is a list of coordinate data 209 indicating the positions of the respective vertices of each of the input polygon models. The coordinate data 209 can be represented by 2 to 4 words per vertex. The coordinate ID 209 is stored at the position indicated by either a pointer or an address indicated by coordinate data address setting of the rendering instruction 204.

The shape data list 207 is a list of shape data 210 indicating information other than the coordinate data of the respective vertices in the vertex data. As examples of the shape data 210, FIG. 3 shows normal line data, color data, and texture coordinate data of the respective vertices. However, the amounts of such data are increased or decreased depending on the rendering option(s). For example, when a complex scene is rendered, the amount of the shape data 210 is several tens of words per vertex. The respective normal line data, color data, and texture coordinate data of the shape data 210 are stored at either the positions indicated by pointers or the positions indicated by the addresses specified by normal line data address setting, color data address setting, and texture coordinate data address setting.

The image generating apparatus 100 in FIG. 2 includes: a host interface 110; a control unit 120; a coordinate data processing unit 130; a transformed coordinate data cache 140; a determining unit 150; a shape data processing unit 160; a modified shape data cache 170; a polygon rendering processing unit 180; and a memory interface 190.

The host interface 110 conveys a rendering start instruction that is input from the CPU to the control unit 120.

Upon receiving the rendering start instruction, the control unit 120 loads the rendering instruction list 202 from the memory 200 via a memory bus (not shown) and the memory interface 190, and conveys the rendering instruction 204 to a coordinate data check unit 131, a coordinate data loading unit 132, and a shape data loading unit 162.

The coordinate data processing unit 130 loads the coordinate data 209 in the vertex data from the memory 200, and performs coordinate transform on the loaded coordinate data 209 to generate transformed coordinate data. As shown in FIG. 2, the coordinate data processing unit 130 includes: the coordinate data check unit 131; the coordinate data loading unit 132; and the coordinate transform unit 133.

The coordinate data check unit 131 judges whether or not the transformed coordinate data of the vertices of each of the polygons is already stored in the transformed coordinate data cache 140. More specifically, the coordinate data check unit 131 accesses the vertex ID list 205 in the vertex data list 203 according to the rendering instruction 204, and loads the vertex ID 208. Next, the coordinate data check unit 131 checks whether or not the transformed coordinate data of each of the vertices indicated by the loaded ID 208 is already stored in the transformed coordinate data cache 140. Next, only when the transformed coordinate data is not yet stored therein, the coordinate data check unit 131 outputs the vertex ID 208 to the coordinate data loading unit 132.

The coordinate data loading unit 132 loads the coordinate data 209 of the vertices from the memory 200 when the coordinate data check unit 131 determines that the transformed coordinate data is not yet stored therein. More specifically, when the coordinate data loading unit 132 receives the vertex ID 208 from the coordinate data check unit 131, the coordinate data loading unit 132 accesses the coordinate data list 206 in the vertex data list 203 according to the rendering instruction 204, loads the coordinate data 209 for each of the vertices, and outputs the loaded coordinate data 209 to the coordinate transform unit 133.

The coordinate transform unit 133 performs coordinate transform on the coordinate data loaded by the coordinate data loading unit 132 to generate transformed coordinate data. More specifically, the coordinate transform unit 133 performs coordinate transform processing on the input coordinate data 209, and outputs the transformed coordinate data to the transformed coordinate data cache 140. The coordinate transform processing is to transform the coordinate data 209 into world coordinates and then into display coordinates. In other words, the transformed coordinate data is coordinate data indicating the positions of the vertices in the display coordinates.

The transformed coordinate data cache 140 is a cache memory for storing the transformed coordinate data generated by the coordinate data processing unit 130. The transformed coordinate data cache 140 receives the vertex ID, 208 from the coordinate data check unit 131. When the transformed coordinate data of a current vertex is not yet stored, the transformed coordinate data cache 140 requests the transformed coordinate data from the coordinate data loading unit 132 and the coordinate transform unit 133, and stores the transformed coordinate data output from the coordinate transform unit 133. In addition, when the transformed coordinate data of the current vertex is already present, the transformed coordinate data cache 140 skips these processes and outputs the transformed coordinate data to the polygon erase determining unit 151.

The determining unit 150 determines whether or not the vertex indicated by the transformed coordinate data is a rendering object, using the transformed coordinate data generated by the coordinate data processing unit 130. As shown in FIG. 2; the determining unit 150 includes: a polygon erase determining unit 151, a vertex erase determining unit 152, and a shape data access vertex ID generating unit 153.

The polygon erase determining unit 151 generates, using the transformed coordinate data, a flag indicating whether or not a current polygon is a rendering object, that is, a flag indicating whether or not the rendering of the polygon is valid (this flag is hereinafter referred to as a polygon rendering validity flag). More specifically, first, the polygon erase determining unit 151 makes a determination on whether or not the rendering of the current polygon is valid (hereinafter referred to as a polygon erase determination), using the transformed coordinate data of the vertices of the polygon that is the object for the determination.

Next, the polygon erase determining unit 151 generates the polygon rendering validity flag based on the result of the determination, and outputs the polygon rendering validity flag to the vertex erase determination unit 152. The polygon rendering validity flag shows True when the current polygon is valid, and shows False when the current polygon is invalid. Specific examples of the polygon erase determinations are described later.

The vertex erase determining unit 152 generates a flag indicating whether or not the current vertex (the flag is hereinafter referred to as a vertex validity flag), using the polygon rendering validity flag. More specifically, first, the vertex erase determining unit 152 makes a determination on whether or not the current vertex of the polygon that is the object for the polygon erase determination is valid, using the polygon rendering validity flag output from the polygon erase determining unit 151. Next, the vertex erase determining unit 152 generates the vertex validity flag based on the result of the determination, and outputs the vertex validity flag to the shape data access vertex ID generating unit 153. The vertex validity flag shows True when the current vertex is valid, and shows False when the current vertex is invalid.

The shape data access vertex ID generating unit 153 outputs, to the shape data check unit 161, the vertex ID 208 used by the coordinate data check unit 131 of only the valid vertex data, with reference to the vertex validity flag output from the vertex erase determining unit 152.

The shape data processing unit 160 loads the shape data 210 from the memory 200, and processes the loaded shape data 210 to generate modified shape data, when both of the following conditions are satisfied: the determining unit 150 determines that the vertex indicated by the transformed coordinate data is the rendering object; and the modified shape data of the vertex is not yet stored in the modified shape data cache 170. Next, the shape data processing unit 160 stores the resulting modified shape data into the modified shape data cache 170. As shown in FIG. 2, the shape data processing unit 160 includes a shape data check unit 161, a shape data loading unit 162, and a shape data modifying unit 163.

The shape data check unit 161 determines whether or not the modified shape data of the vertex determined to be the rendering object by the determining unit 150 is already stored in the modified shape data cache 170. More specifically, the shape data check unit 161 obtains the vertex ID 208 output from the shape data access vertex ID generating unit 153, and checks whether or not the modified shape data of the vertex indicated by the obtained vertex ID 208 is already stored in the modified shape data cache 170. Next, the shape data check unit 161 outputs the vertex ID 208 to the shape data loading unit 162 only when the modified shape data is not yet stored therein.

The shape data loading unit 162 loads the shape data 210 of the vertex from the memory 200 when the shape data check unit 161 judges that the modified shape data is not yet stored therein. More specifically, when the shape data loading unit 162 receives the vertex ID 208 from the shape data check unit 161, the shape data loading unit 162 accesses the shape data list 207 in the vertex data list 203 according to the rendering instruction 204, loads the shape data 210, and outputs the loaded shape data 210 to the shape data modifying unit 163 together with the transformed coordinate data.

The shape data modifying unit 163 processes the shape data 210 loaded by the shape data loading unit 162 to generate modified shape data, and stores the resulting modified shape data into the modified shape data cache 170. More specifically, the shape data modifying unit 163 performs shape data modification on the input shape data 210, and outputs the modified shape data to the modified shape data cache 170.

The shape data modification is processes that are calculation processes performed on the vertex data and that are other than the coordinate transform processes. The calculation processes include a calculation process of calculating a color value by performing an optical source estimation, and a calculation process of calculating a texture coordinate value by performing a texture coordinate estimation. The modified shape data is data which is already subjected to the calculation processes that are other than the aforementioned coordinate transform processes.

The modified shape data cache 170 is a cache memory for storing the modified shape data. The modified shape data cache 170 receives the vertex ID 208 from the shape data check unit 161. When the modified shape data of the vertex is not yet stored therein, the modified shape data cache 170 requests the modified shape data from the shape data loading unit 162 and the shape data modifying unit 163, and stores the modified shape data output from the shape data modifying unit 163. In addition, when the modified shape data of the vertex is already stored therein, the modified shape data cache 170 skips these processes, and outputs the transformed coordinate data and the modified shape data to the polygon rendering processing unit 180.

The polygon rendering processing unit 180 renders the polygon using the transformed coordinate data generated by the coordinate data processing unit 130 and the modified shape data generated by the shape data processing unit 160. More specifically, the polygon rendering processing unit 180 performs polygon rendering processing using the input vertex data (the transformed coordinate data and the modified shape data) to generate a polygon image. The polygon rendering processing is executed according to general processing for use in computer graphics processing. The polygon rendering processing unit 180 outputs the polygon image to the memory 200 via the memory interface 190.

The memory interface 190 exchanges the data between the respective processing units of the image generating apparatus 100 and the memory 200.

Figure 4:
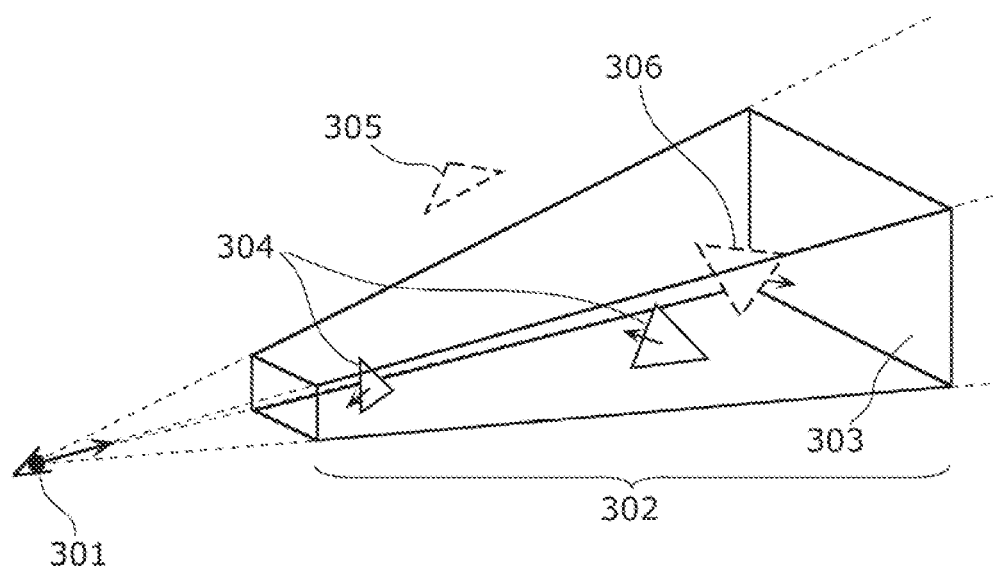
FIG. 4 is a diagram illustrating a polygon erase determination.

Next, a description is given of a polygon erase determination made by the polygon erase determining unit 151. FIG. 4 is a diagram illustrating the polygon erase determination. The polygon erase determination is a process for determining whether or not a current polygon defined by plural vertices is used in the generation of an image.

Although this embodiment is described taking an example of a polygon defined by three vertices, but it is to be noted that a polygon for use here may be defined by four or more vertices.

In a rendering process in computer graphics, as cuts of a scene at the time of starting the rendering of each of frames, a view point 301 that is of a user and indicates an origin of the coordinates and a view volume 302 that is a hexahedron representing the three-dimensional space of a view field when seen from the view point 301 of the user are provided, as coordinate values, to the graphics processing unit (the image generating apparatus 100 in this embodiment).

The polygon erase determination is made using transformed coordinate data that is the coordinate data transformed into a coordinate system (display coordinate system) having, as the origin, the view point 301. The polygon erase determination is made according to either clipping determination and culling determination.

The clipping determination is a process for determining whether or not the transformed coordinate data of the vertices of each polygon is within the view volume 302. This process is performed to render only the polygon(s) present within the view field of the user. When the coordinates of all of the vertices defining a polygon are outside the view volume 302, the rendering of the polygon is made invalid. In other words, when at least one of the vertices defining a polygon is inside the view volume 302, the rendering of the polygon is made valid. For example, as in the case of a polygon such as a polygon 305 whose vertices are all outside the view volume 302, the rendering of the polygon is made invalid by the clipping determination.

On the other hand, the culling determination is a process for determining whether or not a surface of a polygon within the view volume 302 faces front when seen from the view point. This process is performed to render only the polygon(s) facing outward (toward the front surface of) an object among the polygons that define the object. The culling determination makes it possible to determine the front surface and the back surface of the polygon by calculating a surface normal line vector N indicating the orientation of a surface from the coordinates of the vertices defining the polygon, and checking the sign of a scalar product N·V with a view point direction vector V that shows a view point direction from the polygon.

More specifically, when the polygon faces back (N·V<0) when seen from the view point 301, the rendering of the polygon is made invalid. For example, in the case of a polygon such as a polygon 306 that has a surface facing back when seen from the view point 301, the rendering of the polygon is made invalid by the culling determination.

As for only a polygon/polygons such as a polygon 304 for which the rendering is determined to be valid by the clipping determination and the culling determination, the polygon erase determining unit 151 determines the polygon(s) to be valid polygon(s) which can be rendered by performing projection on a display screen 303.

The structure of the image generating apparatus 100 according to this embodiment of the present invention is described up to this point.

Next, a description is given of operations performed by the image generating apparatus 100 according to this embodiment of the present invention.

Figure 5:
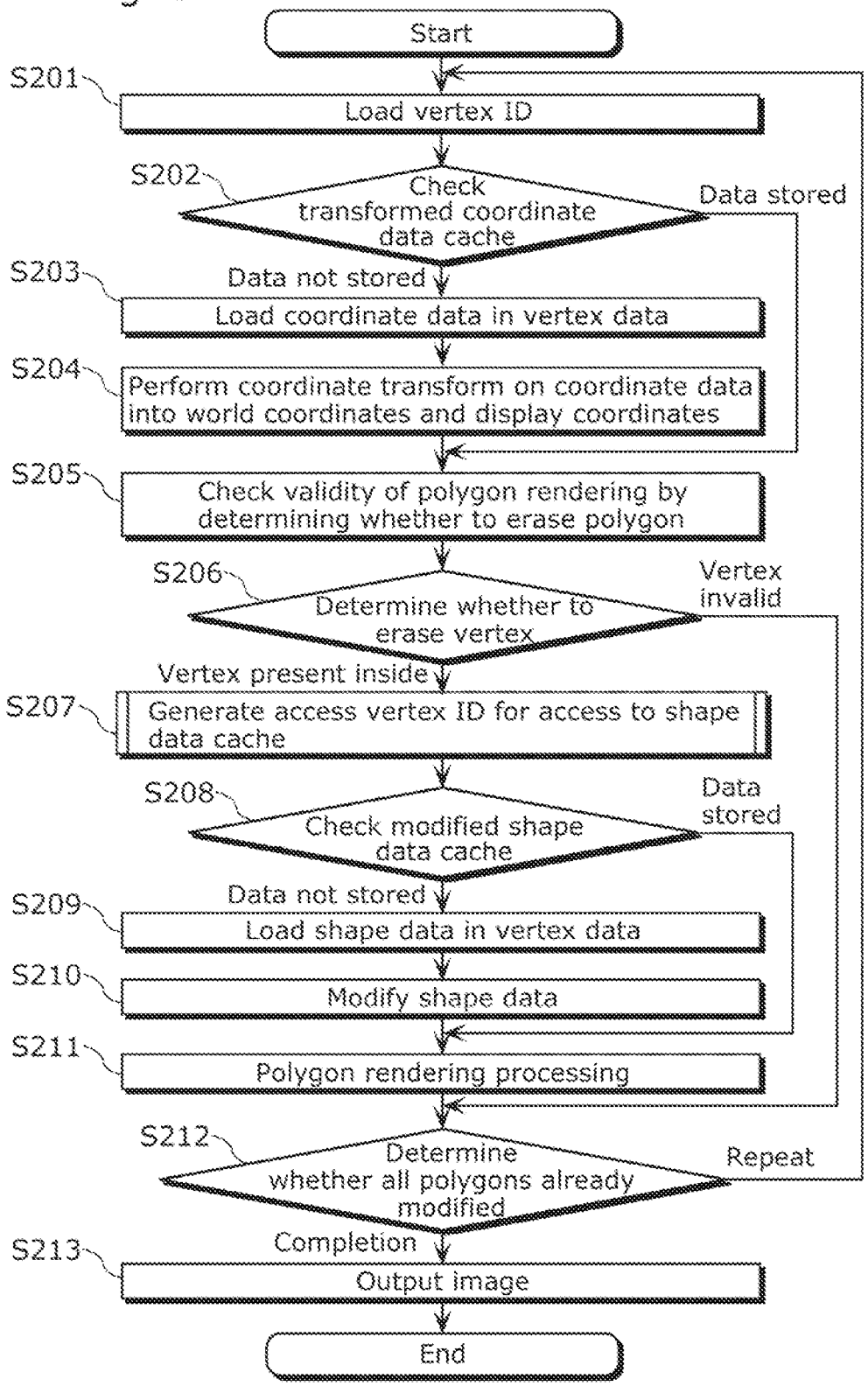
FIG. 5 is a flowchart indicating operations performed by the image generating apparatus according to the embodiment.

FIG. 5 is a flowchart indicating exemplary operations performed by the image generating apparatus 100 according to this embodiment. The image generation processes in this embodiment starts when the control unit 120 receives a rendering instruction 204 from the CPU via a host interface 110.

Based on the instruction from the control unit 120, the coordinate data check unit 131 loads the vertex ID 208 in the vertex data of an input polygon model (S201). Next the coordinate data check unit 131 makes an inquiry to the transformed coordinate data cache 140 using the loaded vertex ID 208 (S202). In other words, the coordinate data check unit 131 checks whether or not the transformed coordinate data of the vertex indicated by the loaded ID 208 is already stored in the transformed coordinate data cache 140.

When the transformed coordinate data of the vertex corresponding to the vertex ID 208 is already stored therein ("Data stored" in S202), the loading of the coordinate data 209 of the vertex from the memory 200 and the coordinate transform processing on the coordinate data 209 are not executed. In this way, the coordinate data can be re-used using the cache, which produces an advantageous effect of reducing the load time.

On the other hand, when the transformed coordinate data of the vertex corresponding to the vertex ID 208 is not yet stored therein ("Data not stored" in S202), the vertex ID 208 is output to the coordinate data loading unit 132 in order to execute the loading of the coordinate data 209 of the vertex from the memory 200 and the as coordinate transform processing on the coordinate data 209.

The coordinate data loading unit 132 loads the coordinate data 209 corresponding to the vertex ID 208 in the vertex data of the input polygon model (S203). The coordinate transform unit 133 transforms the loaded coordinate data 209 into world coordinates and then into display coordinates to generate transformed coordinate data, and stores the resulting transformed coordinate data into the transformed coordinate data cache 140 (S204).

The polygon erase determining unit 151 makes a polygon erase determination using the transformed coordinate data of the vertices defining the polygon that is the object for the determination (S205). More specifically, the polygon erase determining unit 151 performs the clipping determination and the culling determination as described with reference to FIG. 4.

The vertex erase determining unit 152 performs, for example, a vertex erase determination using a polygon validity flag (S206), depending on the result of the polygon erase determination made on the polygon including at least one vertex that is the object for the determination. When the rendering of the polygon that is the object for the polygon erase determination is found to be valid ("vertex is valid" in S206) as a result of the polygon erase determination, the vertex erase determining unit 152 determines that the vertex in the determination-object polygon is valid vertex data. On the other hand, when the rendering of the determination-object polygon is found to be invalid ("vertex is invalid" in S206), the vertex erase determining unit 152 determines that the vertex in the object polygon is invalid vertex data.

According to the result of the vertex erase determination made by the vertex erase determining unit 152, the shape data access vertex ID generating unit 153 outputs the vertex ID 208 of only the vertex data determined to be valid to the shape data check unit 161, for example, with reference to a vertex validity flag (S207). This eliminates the necessity of storing the shape data unnecessary for the rendering into the cache, and thus it is possible to effectively utilize the modified shape data cache 170. It is to be noted that detailed operations performed by the shape data access vertex ID generating unit 153 are described later.

The shape data check unit 161 makes an inquiry to the modified shape data cache 170 using the vertex ID 208 received from the shape data access vertex ID generating unit 153 (S208). When the modified shape data of the vertex corresponding to the vertex ID 208 is already stored therein ("Data stored" in S208), the loading of the shape data 210 of the vertex from the memory 200 and the shape data modification are not executed.

On the other hand, when the modified shape data of the vertex corresponding to the vertex ID 208 is not yet stored therein ("Data not stored" in S208), the vertex ID 208 is output to the shape data loading unit 162 in order to execute the loading of the shape data 210 of the vertex from the memory 200 and the shape data modification.

The shape data loading unit 162 loads the shape data 210 corresponding to the vertex ID 208 in the vertex data of the input polygon model (S209). The shape data modifying unit 163 performs the modification using the loaded shape data 210 to generate modified shape data, and stores the resulting modified shape data into the modified shape data cache 170 (S210).

The polygon rendering processing unit 180 performs polygon rendering processing using the vertex data (transformed coordinate data and modified shape data) received from the modified shape data cache 170 (S211).

The image generating apparatus 100 determines whether or not the aforementioned processing is already completed for all the polygons (S212). When determining that the processing is not yet completed ("Repeat" in S212), the image generating apparatus 100 repeats the respective processes (S201 to S211). When determining that the processing is already completed ("Completion" in S212), the image generating apparatus 100 outputs a rendered image (S213).

In this way, the image generating apparatus 100 in this embodiment accesses the transformed coordinate data cache 140 for each of all the pieces of vertex ID, and accesses the modified shape data cache 170 only for each of the vertices determined to be valid. For this reason, it is possible to assign an area/areas of cache memory to the essential vertex data for use in the polygon rendering, and thereby to effectively utilize the resource of the cache memory.

In this way, the image generating apparatus 100 is capable of is reducing the amount of memory access and the calculation amount required in the loading of the input polygon data more significantly than the conventional image processing apparatus. Furthermore, the image generating apparatus 100 in this embodiment is applicable to interactive applications because the image generating apparatus 100 determines whether or not the vertices are necessary for the polygon rendering in parallel with image rendering processing.

Hereinafter, the image generating apparatus 100 in this embodiment is described in more detail. Here, the description is given of a case where the representation format of a polygon is a polygon mesh.

Figure 6:
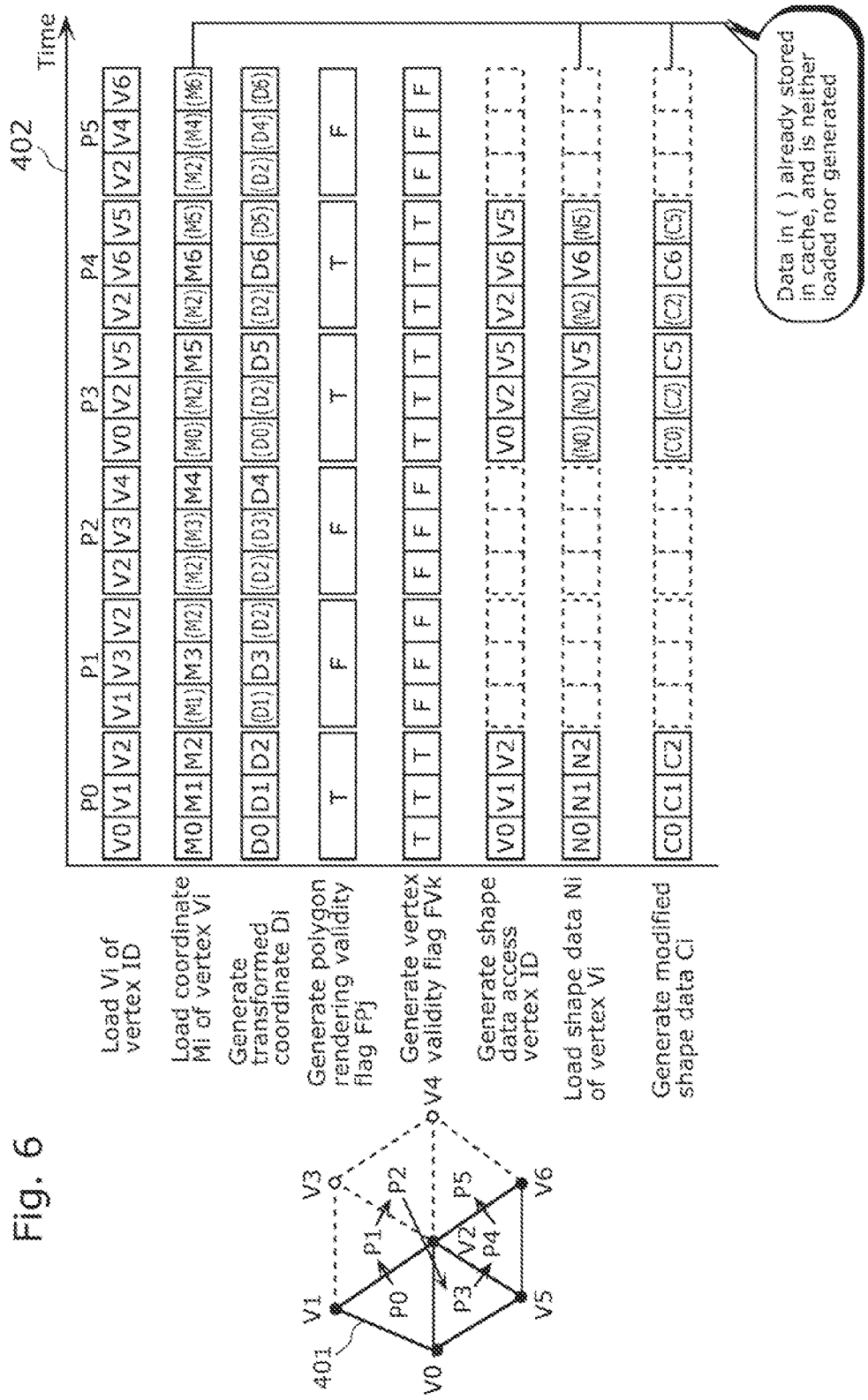
FIG. 6 is a diagram showing a flow of processes according to the embodiment.

FIG. 6 is a diagram showing a flow of processes performed in the case where the input polygon model is formed in a polygon mesh format. The polygon mesh format is a format in which many number of internal polygons share vertexes with each other.

As shown in the diagram, the vertex data of the polygon mesh 401 is specified according to the following exemplary order: P0 (V0, V1, V2)→P1 (V1, V3, V2)→P2 (V2, V3, V4)→P3 (V0, V2, V5)→P4 (V5, V2, V6)→P5 (V2, V4, V6). It is to be noted that the polygon mesh is a highly flexible format, and thus the aforementioned specification order is not necessarily used. In addition, in the example shown in FIG. 6, it is assumed that the polygons P0, P3, and P4 are valid, and the polygons P1, P2, and P5 are invalid.

A time chart 402 is a time chart indicating a flow of processes from the loading of the vertex ID to the generation of modified shape data. Hereinafter, the flow of processes using the polygon mesh icy format is described with reference to a time chart 402.

The coordinate data check unit 131 loads the vertex ID Vi (i=0 to 6) in the vertex data, and makes an inquiry to the transformed coordinate data cache 140 using the loaded vertex ID Vi.

When no transformed coordinate data of the vertex is already stored therein, the coordinate data loading unit 132 loads the coordinate data Mi in the vertex data. Next, the coordinate transform unit 133 performs coordinate transform on the loaded coordinate data Mi to generate transformed coordinate data Di. Next, the coordinate transform unit 133 stores the transformed coordinate data Di into the transformed coordinate data cache 140.

When the transformed coordinate data Di of the vertex is already stored therein, the coordinate data of the same vertex on the polygon mesh is referred to, and thus the same processing is not executed more than once. In the example of FIG. 6: the pieces of vertex ID are loaded according to the following order of V0→V1→V2→V1→V3→V2→ V2→V3→V4→V0→V2→V5→V2→V6→V5→V2→V4→V6; the processes performed on the coordinate data, that are, the loading and coordinate transform of the coordinate data are performed according to the order of V0→V1→V2→V3→V4→V5→V6; and each of the vertices for which an inquiry is already made at least once is not re-processed. In other words, the loading and coordinate transform of the coordinate data are executed only once per vertex.

For example, as shown in FIG. 6, the coordinate data M1 and M2 among the coordinate data of the vertices of a polygon P1 are not loaded, and thus no coordinate transform (generation of transformed coordinate data D1 and D2) is executed on the coordinate data M1 and M2. It is to be noted that these processes are already executed in the processing of the polygon P0.

The polygon erase determining unit 151 reads out, from the transformed coordinate data cache 140, the transformed coordinate data Di of each vertex of the polygon Pj (j=0 to 5), and generates a polygon rendering validity flag FPj using the read-out transformed coordinate data Di. As described above, it is to be noted that the polygon rendering validity flag FPj shows True (T) when the corresponding polygon is valid, and shows False (F) when the corresponding polygon is invalid. In the example of FIG. 6, the polygon erase determination is performed according to the order of P0→P1→P2→P3→P4→P5.

The vertex erase determining unit 152 makes a vertex erase determination on a vertex Vk (k=0 to 15) using the polygon rendering validity flag FPj. In other words, as shown in the following (Expression 1), when the polygon rendering validity flag FPj of the polygon including the vertex Vk is True, the vertex validity flag FVk of the vertex Vk is also assumed to be True.

$$FVk=(FPj \& (Vk \text{ is an element of } Pj))$$ (Expression 1)

In the vertex erase determination, it is to be noted that the vertex Vk is a vertex indicating the vertex ID input as the k+1-th vertex ID by the vertex erase determining unit 152. For example, the vertex V0 in the vertex erase determination is the vertex indicated by the first input vertex ID, that is, the vertex V0 of the polygon P0. Likewise, the vertex V4 is the vertex indicated by the fifth input vertex ID, that is, the vertex V3 of the polygon P1.

Accordingly, as shown in FIG. 6, the number of the vertex validity flags FVk corresponds to the number of vertices input by the vertex erase determining unit 152. In other words, plural vertex validity flags FVk are generated for each identical vertex.

In the example of FIG. 6, when the vertex erase determining unit 152 makes vertex erase determinations on respective vertices Vk (k=0 to 15), the vertex erase determining unit 152 receives the polygon rendering validity flags FPj generated by the polygon erase determining unit 151 according to the order of T→F→F→T→T→F. Next, according to the above (Expression 1), the vertex erase determining unit 152 generates, for the respective vertices Vk (k=0 to 15) defining the polygon Pj (j=0 to 5), the vertex validity flags FVk according to the order T→T→T→F→F→F→F→F→F→T→T→T→T→T→T→F→F→F.

Figure 7:
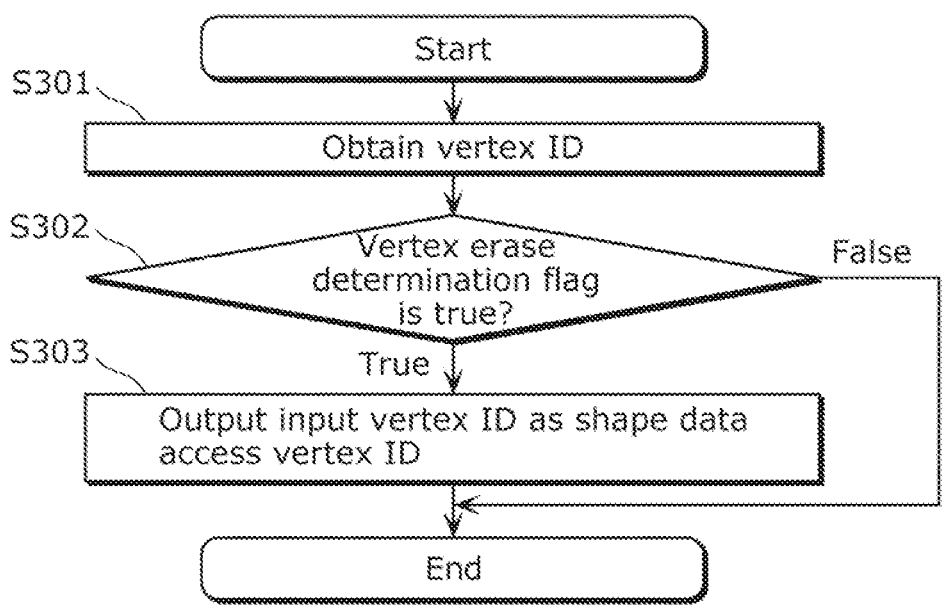
FIG. 7 is a flowchart indicating an example of a method of generating a shape data access vertex ID (the ID of a vertex for access to shape data) in processing according to the embodiment.

The shape data access vertex ID generating unit 153 generates pieces of vertex ID for accessing the shape data check unit 161, using the vertex validity flags FVk. FIG. 7 shows a flowchart of a method of generating shape data access vertex ID.

First, the shape data access vertex ID generating unit 153 obtains the original vertex ID loaded and used by the coordinate data processing unit 130 (S301). Next, the shape data access vertex ID generating unit 153 determines whether or not the vertex validity flag FVk of a current vertex is True (S302).

When the vertex validity flag FVk is True ("True" in S302), the shape data access vertex ID generating unit 153 outputs the input vertex ID as the shape data access vertex ID (S303). When the vertex validity flag FVk is False ("False" in S302), the shape data access vertex ID generating unit 153 does not output the input vertex ID.

In other words, the shape data access vertex ID generating unit 153 outputs the vertex ID of only each of the vertices corresponding to the vertex validity flag FVk indicating "True" to the shape data check unit 161. In the example of FIG. 6, the pieces of vertex ID output to the shape data check unit 161 are generated according to the order of V0→V1→V2→V0→V2→V5→V2→V6→V5.

As described above, the shape data access vertex ID generating unit 153 has a function of generating a rendering vertex list indicating only the vertices determined to be rendering objects. For example, the rendering vertex list is a list indicating the order of V0→V1→V2 V0→V2→V5→V2→V6→V5 as shown in FIG. 6.

The shape data check unit 161 makes an inquiry to the modified shape data cache 170 using the pieces of vertex ID Vi (i=0 to 6) generated by the shape data access vertex ID generating unit 153. In other words, the shape data check unit 161 judges whether or not the modified shape data of the vertex indicated in the rendering vertex list is already stored in the modified shape data cache 170.

When no modified shape data of a current vertex is already stored, the shape data loading unit 162 loads the shape data Ni in the vertex data. Next, the shape data modifying unit 163 processes the loaded shape data Ni to generate modified shape data Ci. Next, the shape data modifying unit 163 stores the resulting modified shape data Ci into the modified shape data cache 170.

When the modified coordinate data Ci of the vertex is already stored therein, the shape data of the same vertex on the polygon mesh is referred to, and thus the same processing is not executed more than once. In the example of FIG. 6, the pieces of vertex ID are generated according to the order of V0→V1→V2→V0→V2→V5→V2→V6→V5. However, processes on the shape data, that are, the loading and modification of the shape data are performed according to the order of V0→V1→V2→V5→V6, and the vertices for which an inquiry is already made at least once are not re-modified. In short, the loading and modification of the shape data are executed only once per vertex.

For example, as shown in FIG. 6, the shape data N0 and N2 in the vertices of the polygon P3 are not loaded, and thus no process (generation of modified data C0 and C2) is executed on the shape data N0 and N2. It is to be noted that these processes are already executed in the processing of the polygon P0.

FIG. 8 is a diagram showing a structure of the transformed coordinate data cache 140 and a structure of the modified shape data cache 170. As for the structure of each cache, a cache memory is divided into units of cache lines, and each of the cache lines is is assigned with a unique entry number. As shown in FIG. 8, each cache line includes an entry number, a vertex ID (cache tag), a reference counter, a cache line validity flag, and a cache line memory.

The entry number is an identifier for associating with data inside the cache. The vertex ID (cache tag) is a vertex ID identifying the vertex managed in the cache line. The reference counter is a counter for counting the number of reference vertices whose data is currently being referred to. The cache line validity flag is flag information indicating whether or not valid data is already stored in the cache line. Each of the cache lines in the cache memory is a data storage unit for storing either transformed coordinate data or modified shape data.

When the reference counter of a cache line is 0, it is possible to register a new vertex ID assuming that the cache line is vacant. The reference counter is incremented each time the vertex ID is required, and more specifically, each time an inquiry for the vertex ID is made. In contrast, the reference counter is decremented each time a polygon is rendered using either the corresponding transformed coordinate data or the corresponding modified shape data. The example shown in FIG. 8 shows a cache in the case where the polygons P0 to P5 as shown in FIG. 6 are ready to be rendered because all the pre-processes are already successfully completed but these polygons are not yet rendered.

In addition, when the cache line validity flag shows False (F), no valid data is stored yet in the cache line memory, and thus the loading of the data from the cache memory is blocked.

A description is given of operations performed by each cache (either the transformed coordinate data cache 140 or the modified shape data cache 170) in FIG. 8.

First, when an inquiry for a vertex ID is made to a cache, the cache searches the pieces of vertex ID of the cache lines for the cache line that satisfies one of the conditions of (i) the reference counter is not 0 and (ii) the cache line validity flag shows True, to find out whether or not the cache line having the identical vertex ID value is included.

When the cache line having the identical vertex ID is included, the cache increments the reference counter of the cache line by 1, and neither re-loads nor re-calculates the data. When no cache line having the identical vertex ID is included, the cache searches for the cache line whose reference counter shows 0, registers therein the vertex ID for which the inquiry is already made, and sets 1 to the reference counter. Next, the cache sets the cache line validity flag to False (F), and waits until the data is loaded and modified. When the modified data is input to the cache, the cache stores the modified data into the cache line memory, and sets the cache line validity flag to True (T).

Next, the cache loads, from the cache line memory, the data of the vertex ID for which the inquiry for polygon rendering is already made, and decrements the reference counter of the cache line by 1.

When the cache in FIG. 8 which operates as described above executes the processes in this embodiment, access is made to every piece of vertex ID in the vertex ID list in the transformed coordinate data cache 140. Thus, the coordinate data of each vertex is modified at least once irrespective of whether the polygon rendering is valid or invalid, and the modified coordinate data is stored in the cache lines in the cache memory. On the other hand, in the case of the modified shape data cache 170, access is made to only each piece of the vertices necessary for the rendering. Thus, the minimum shape data is modified and stored in the cache lines in the cache memory. Accordingly, it is possible to effectively utilize the area(s) of the cache line(s) in the cache memory, and thereby to make it possible to reduce the amount of memory access and the amount of calculation more significantly than the conventional image processing apparatus.

Hereinafter, how to execute the above-described processes is described based on a data flow between the respective processing units of the image generating apparatus 100 according to this embodiment.

Figure 9:
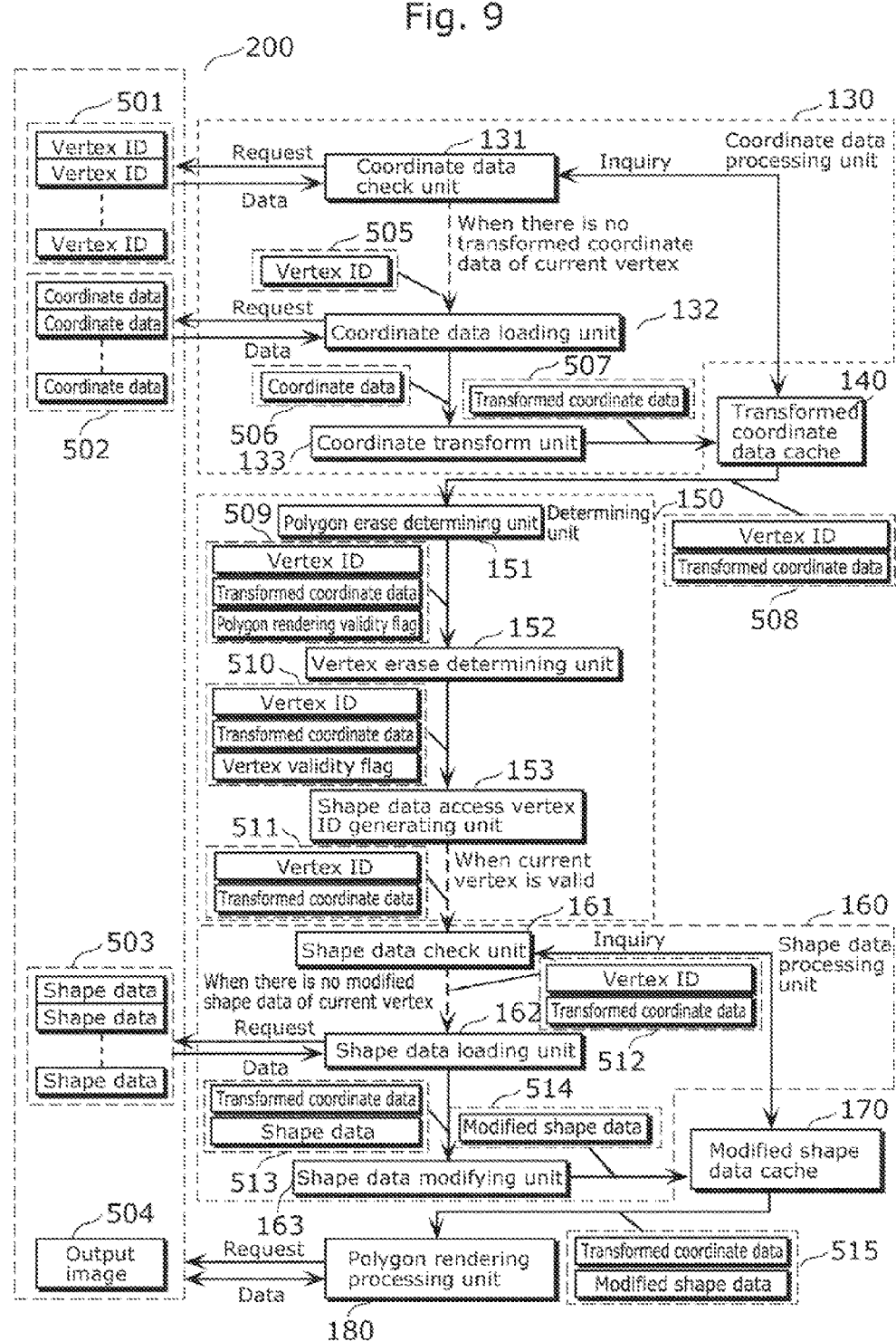
FIG. 9 is a diagram showing a data flow between processing units of the image generating apparatus according to the embodiment.

FIG. 9 is a diagram showing a data flow between processing units of the image generating apparatus 100 according to this embodiment. As shown in the diagram, it is assumed that a vertex ID list 501 of the input polygon model, a coordinate data list 502, and a shape data list 503 are arranged in a memory 200. Furthermore, the memory 200 also stores an output image 504 that is to be output by the polygon rendering processing unit 180.

The coordinate data check unit 131 loads a vertex ID 505 by accessing the vertex ID list 501 in the memory 200. Next, the coordinate data check unit 131 makes an inquiry about transformed coordinate data of the vertex to the transformed coordinate data cache 140. When the transformed coordinate data is not yet stored as therein, the coordinate data check unit 131 outputs the vertex ID to the coordinate data loading unit 132.

The coordinate data loading unit 132 accesses the coordinate data list 502 in the memory 200, loads the coordinate data 506 corresponding to the vertex ID 505, and outputs the loaded coordinate data 506 to the coordinate transform unit 133.

The coordinate transform unit 133 performs coordinate transform on the coordinate data 506 to generate transformed coordinate data 507, and stores the resulting transformed coordinate data 507 into the transformed coordinate data cache 140.

The polygon erase determining unit 151 receives, as data 508, the vertex ID and the transformed coordinate data of each of the vertices of the determination-object polygon from the transformed coordinate data cache 140, and generates a polygon rendering validity flag. Next, the polygon erase determining unit 151 outputs, as data 509, the vertex ID; the transformed coordinate data, and the polygon rendering validity flag to the vertex erase determining unit 152.

The vertex erase determining unit 152 generates a vertex validity flag using the vertex ID, the transformed coordinate data, and the polygon rendering validity flag (data 509) output from the polygon erase determining unit 151. Next, the vertex erase determining unit 152 outputs, as data 510, the vertex ID, the transformed coordinate data, and the vertex validity flag to the shape data access vertex ID generating unit 153.

The shape data access vertex ID generating unit 153 refers to the vertex ID, the transformed coordinate data, and the vertex validity flag (data 510) output from the vertex erase determining unit 152. Next, the shape data access vertex ID generating unit 153 outputs the vertex ID and the transformed coordinate data as data 511 to the shape data check unit 161 only when the vertex validity flag shows True.

The shape data check unit 161 makes an inquiry to the modified shape data cache 170 using the vertex ID of the data 511 output from the shape data access vertex ID generating unit 153. Next, the shape data check unit 161 outputs, as data 512, the vertex ID and the transformed coordinate data included in the data 511 to the shape data loading unit 162 when no modified shape data of the vertex is already stored therein.

The shape data loading unit 162 accesses the shape data list 503 in the memory 200, and loads the vertex ID of the transformed coordinate data (data 512) and the shape data corresponding to the vertex ID. Next, the shape data loading unit 162 outputs, as data 513, the transformed coordinate data and the loaded shape data to the shape data modifying unit 163.

The shape data modifying unit 163 calculates the modified shape data 514 using the transformed coordinate data and the shape data (data 513). Next, the shape data modifying unit 163 stores the modified shape data 514 into the modified shape data cache 170.

The polygon rendering processing unit 180 receives, from the modified shape data cache 170, the transformed coordinate data and the modified shape data (data 515) of the polygon that is a rendering object, and performs polygon rendering processing to generate an output image 504 in the memory 200.

The image generating apparatus and the image generating method according to this embodiment are intended to access the modified shape data cache that stores the shape data other than the coordinate data among the vertex data of each of the input polygon models, by using only the pieces of vertex ID of the vertices determined to be valid by the vertex erase determinations.

In this way, it is possible to reduce the amount of memory access and the calculation amount that are required when the graphics processing unit (image generating apparatus) loads the vertex data of the input polygon model from the memory. Accordingly, even an information processing apparatus that has a calculation performance lower than that of the conventional image processing apparatus can perform polygon rendering processing on a large number of input polygons with high accuracy in real time.

Operations performed by the image generating apparatus according to the embodiment are described above.

Although the image generating apparatus and the image generating method according to the present invention are described based on the embodiment, but the present invention is not limited to the embodiment. Those skilled in the art will readily appreciate that various kinds of modifications are possible in the exemplary embodiment, and also other embodiments are obtainable by arbitrarily combining the structural elements in the variations of the embodiment without materially departing from the scope of the present invention. Accordingly, all such modifications and other embodiments are intended to be included within the scope of the present invention.

For example, as for the representation formats of input polygon models, any other representation format than the aforementioned polygon mesh format may be included. In addition, as for the vertex ID list, a vertex ID list may be generated inside or outside the image generating apparatus 100.

FIG. 10A to FIG. 10C show examples of transform from representation formats (a polygon strip, a polygon fan, an independent polygon) other than the polygon mesh format to the polygon mesh format.

Each of vertex ID lists 604, 607, and 610 provided in the form of either the polygon strip 601, the polygon fan 602, or the independent polygon 603 can be transformed into a corresponding one of vertex ID lists 605, 608, and 611 in the form of the polygon mesh format. In addition, even when no pre-specified vertex ID list exists (in this case, the coordinate data and shape data are loaded in order starting at the top memory address), it is possible to generate the vertex ID lists 606, 609, and 612 in the form of the polygon mesh format.

It is to be noted that arrows showing the vertex ID lists 605 and 606 mean that the order therein is an inverse order with respect to the order in the vertex list for the polygon strip format.

In addition, although a vertex ID is used to associate the coordinate data and the shape data of the vertex in this embodiment, it is also possible to use other data such as a memory address pointer that shows the coordinate data and the shape data of the vertex instead of using the vertex ID.

In addition, the polygon erase determining unit 151 makes clipping determinations and culling determinations, but it is also possible to perform only one of the two kinds of determinations depending on rendering options.

Furthermore, it is also possible to include, as a clipping determination, an erase determination that is made assuming that an arbitrary plane within a three-dimensional space is a boundary. Alternatively, it is also possible to include an erase determination that is made assuming that an arbitrary area on a display screen 303 is a boundary.

In addition, it is also possible to include, as culling determinations, an erase determination on a polygon that requires less than 1 dot when projected on the display screen 303 and an erase determination on a polygon that completely disappears from the view point 301 when another polygon is rendered within the view volume 302.

In addition, some or all of the functional blocks of the image generating apparatus 100 as shown in FIG. 2 may be parallelized or perform pipe line processing. Alternatively, some of the functional blocks may be integrated into one block.

In addition, depending on implementations of the present invention, the functions of the coordinate data check unit 131 and the transformed coordinate data cache 140 of the image generating apparatus 100 as shown in FIG. 2 may be either included in the shape data check unit 161 or the modified shape data cache 170, or eliminated.

In the above description, the image generating apparatus 100 as shown in FIG. 2 is configured to include the modified shape data cache 170 and to store the modified shape data into the modified shape data cache 170. However, the image generating apparatus 100 may store the original shape data read out from the memory 200 into a cache. In other words, as shown in FIG. 11, the image generating apparatus 100 may store the original shape data in a cache instead of storing the modified shape data.

Figure 11:
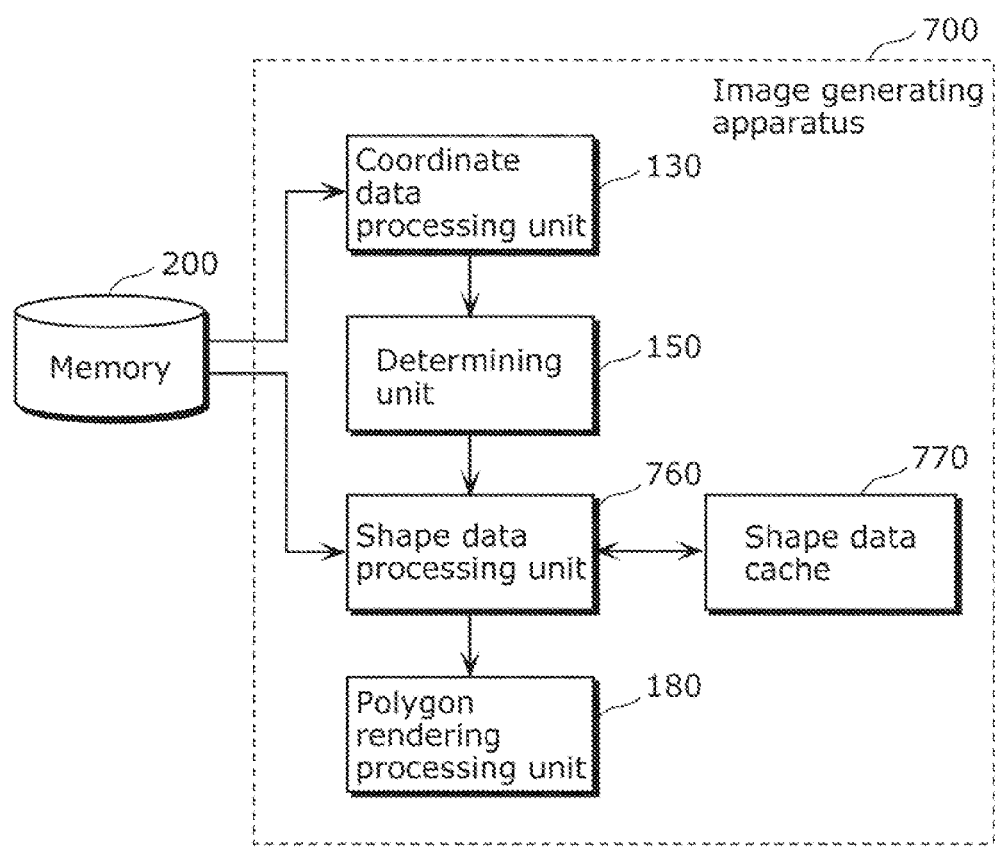
FIG. 11 is a block diagram of an exemplary structure of an image generating apparatus according to a variation of the embodiment.

FIG. 11 is a block diagram of an exemplary structure of an image generating apparatus 700 according to a variation of this embodiment of the present invention.

As shown in FIG. 11, the image generating apparatus 700 includes a coordinate data processing unit 130, a determining unit 150, a shape data processing unit 760, a shape data cache 770, and a polygon rendering processing unit 180. It is to be noted that the same structural elements as in FIG. 2 are assigned with the same reference signs.

The coordinate data processing unit 130 loads coordinate data in the vertex data from a memory 200, and performs coordinate transform on the loaded coordinate data to generate transformed coordinate data.

The determining unit 150 determines whether or not the vertex indicated by the transformed coordinate data is a rendering object, using the transformed coordinate data generated by the coordinate data processing unit 130.

The shape data processing unit 760 outputs shape data to the polygon rendering processing unit 180 when the determining unit 150 determines that the vertex indicated by the transformed coordinate data is the rendering object.

More specifically, the shape data processing unit 760 loads the shape data from the memory 200, and stores the loaded shape data into the shape data cache 770 when both the following conditions are satisfied: the determining unit 150 determines that the vertex indicated by the transformed coordinate data is the rendering object; and the shape data of the vertex is not yet stored in the shape data cache 770. On the other hand, the shape data processing unit 760 causes the shape data cache 770 to output the shape data to the polygon rendering processing unit 180 when both the following conditions are satisfied: the determining unit 150 determines that the vertex indicated by the transformed coordinate data is the rendering object; and the shape data of the vertex is already stored in the shape data cache 770.

The polygon rendering processing unit 180 renders the polygon using the transformed coordinate data generated by the coordinate data processing unit 130 and the shape data stored in the shape data cache 770.

As shown by the aforementioned structure, the image generating apparatus 700 according to this variation of the embodiment of the present invention stores the shape data loaded from the memory 200 into the shape data cache 770 without modifying the shape data. In this way, it is possible to reduce the amount of access to the memory 200. Furthermore, the aforementioned image generating apparatus 700 is also effective even when there is no need to modify the shape data.

Figure 12:
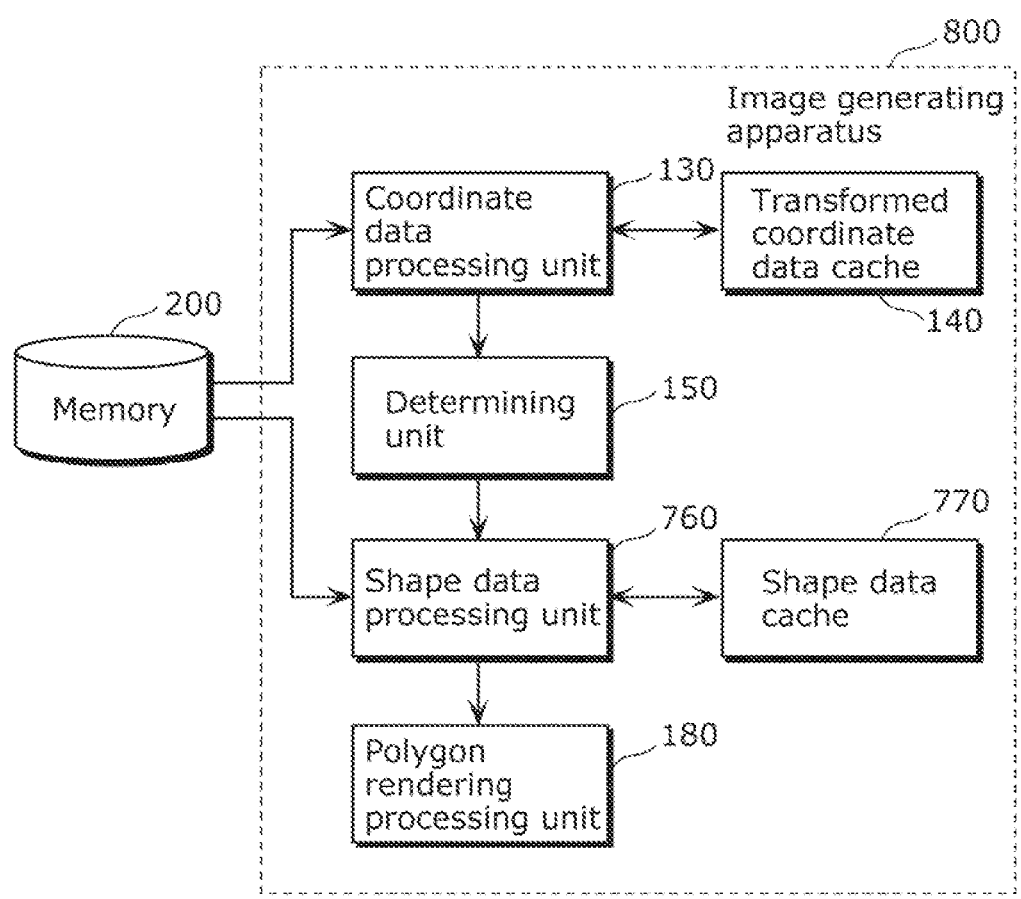
FIG. 12 is a block diagram of another exemplary structure of an image generating apparatus according to a variation of the embodiment.

In addition, as shown in FIG. 12, the image generating apparatus according to the present invention may further include a transformed coordinate data cache in addition to the structural elements as shown in FIG. 11. FIG. 12 is a block diagram of an exemplary structure of an image generating apparatus 800 according to a variation of the embodiment of the present invention.

As shown in FIG. 12, the image generating apparatus 800 differs from the image generating apparatus 700 as shown in FIG. 11 in the point of further including a transformed coordinate data cache 140. The same structural elements as in FIG. 2 and FIG. 11 are assigned with the same reference signs, and the same descriptions are not repeated here.

When transformed coordinate data is already stored in a transformed coordinate data cache 140, a determining unit 150 determines whether or not the vertex indicated by the transformed coordinate data stored in the transformed coordinate data cache 140 is a rendering object using the transformed coordinate data.

Furthermore, the present invention can be implemented as an information processing apparatus including the image generating apparatuses 100, 700, or 800 as shown in FIG. 2, 11, or 12, respectively.

Figure 13:
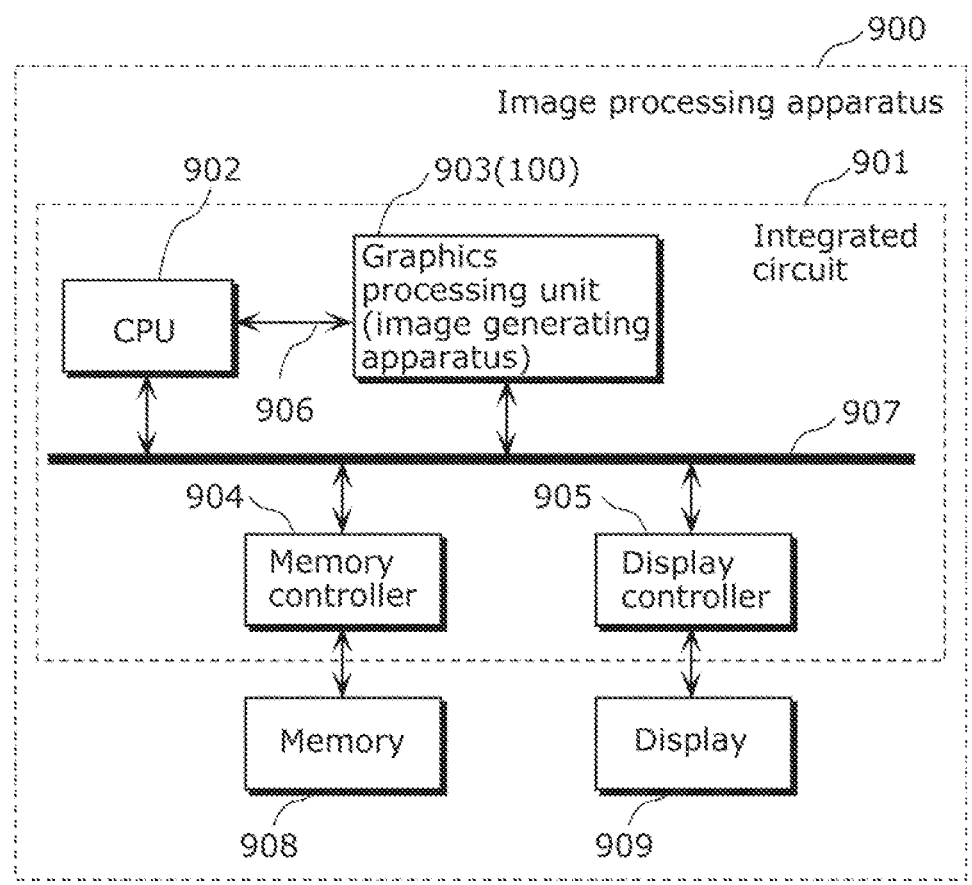
FIG. 13 is a block diagram of a structure of an image processing apparatus according to the embodiment.

FIG. 13 is a block diagram showing a structure of an image processing apparatus 900 including the image generating apparatus 100 as shown in FIG. 2. The image processing apparatus 900 includes an integrated circuit 901, a memory 908, and a display 909.

The integrated circuit 901 is, for example, a system LSI, and includes a CPU 902, a graphics processing unit 903 (the image generating apparatus 100 in FIG. 2), a memory controller 904, a display controller 905, a CPU bus 906, and a memory bus 907.

The CPU 902 stores a rendering instruction list 202 and a vertex data list 203 into the memory 908 via the memory bus 907 and the memory controller 904. In addition, the CPU 902 conveys the rendering instruction to the graphics processing unit 903 via the CPU bus 906.

The graphics processing unit 903 accesses the rendering instruction list 202 and the vertex data list 203 stored in the memory 908 via the memory bus 907 and the memory controller 904, and performs the aforementioned image generating processing. The resulting image is stored in the memory 908 via the memory bus 907 and the memory controller 904. The generated image stored in the memory 908 is output to the display 909 via the display controller 905.

As for how the CPU 902 stores the vertex data list 203 into the memory 908, the CPU 902 may divide the vertex data list 203 into a vertex ID list 205 that is always loaded, a coordinate data list 206 that is loaded only once, and a shape data list 207 that is not loaded when the vertex is already determined to be invalid in a vertex erase determination or when the shape data list 207 is already loaded before, and may store the respective lists to separate memory areas. In this way, it is possible to prevent shape data determined to be unnecessary from being loaded together with the associated coordinate data when the memory bus 907 and the memory controller 904 load the vertex data list 203 in the memory 908 by memory access, and thereby to make it possible to increase the memory access efficiency.

In addition, each of the functional blocks such as the CPU 902 and the graphics processing unit 903 of the integrated circuit 901 as shown in FIG. 13 may be individually formed as an integrated circuit. Alternatively, some or all of the functional blocks may be integrated into a single integrated circuit. The integrated circuit 901 may include any other functional block such as an AV (Audio Visual) processing unit or a streaming processing unit. The memory 908 may be mounted inside the integrated circuit 901. Alternatively, plural memories 908 may be mounted inside the integrated circuit 901 or provided outside the integrated circuit 901.

It is to be noted that the image generating apparatus according to the embodiment of the present invention is typically implemented as an LSI that is a semiconductor integrated circuit. Each of these structural elements may be made into one chip individually, or all or some of the structural elements may be made into one chip. The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Field Programmable Gate Array (FPGA) that can be programmed after manufacturing LSI or a reconfigurable processor that allows re-configuration of the connection or configuration of LSI can be used for the same purpose. Furthermore, when a circuit integration technology for replacing LSIs with new circuits appears in the future with advancement in semiconductor technology and derivative other technologies, the circuit integration technology may as be naturally used to integrate the functional blocks. Application of biotechnology is one such possibility.

Furthermore, it is possible to configure rendering apparatuses suitable for various applications by combining a semiconductor chip on which the image generating apparatus according to the embodiment of the present invention is integrated and a display for rendering an image. The present invention can be used as information rendering means included in mobile phones, television sets, digital video recorders, digital video cameras, car navigation systems, etc. As for a display provided thereto, it is possible to combine the display with (i) a Braun tube (CRT: Cathode Ray Tube), (ii) a liquid crystal display, a PDP (Plasma Display Panel) etc., (iii) a flat display such as an organic EL (Electro luminescence) display, (iv) a projector display represented by a projector.

INDUSTRIAL APPLICABILITY

An image generating apparatus according to the embodiment of the present invention is useful for various applications. For example, the present invention is highly useful as information display means for menu display, Web browsers, editors, EPGs (Electronic Program Guides), map display, etc., (i) in cell-driven mobile display terminals such as mobile phones, mobile music players, digital cameras, digital video cameras, etc., and/or (ii) in high-resolution information display devices such as television sets, digital video recorders, car navigation systems, etc.

REFERENCE SIGNS LIST

100, 700, 800 Image generating apparatus
110 Host interface
120 Control unit
130 Coordinate data processing unit
131 Coordinate data check unit
132 Coordinate data loading unit
133 Coordinate transform unit
140 Transformed coordinate data cache
150 Determining unit 151 Polygon erase determining unit
152 Vertex erase determining unit
153 Shape data access vertex ID generating unit
160, 760 Shape data processing unit
161 Shape data check unit
162 Shape data loading unit
163 Shape data modifying unit
170 Modified shape data cache
180 Polygon rendering processing unit
190 Memory interface
200, 908 Memory
201 Input data
202 Rendering instruction list
203 Vertex data list
204 Rendering instruction
205, 501 Vertex ID list
206, 502 Coordinate data list
207, 503 Shape data list
208, 505 Vertex ID
209, 506 Coordinate data
210 Shape data
301 Viewpoint
302 View volume
303 Display screen
304, 305, 306 Polygon
401 Polygon mesh
402 Time chart
504 Output image
507 Transformed coordinate data
508, 509, 510, 511, 512, 513, 515 Data
514 Modified shape data
601 Polygon strip
602 Polygon fan
603 Independent polygon
604, 605, 606, 607, 608, 609, 610, 611, 612 Vertex ID list
770 Shape data cache
900 Information processing apparatus
901 Integrated circuit
902 CPU
903 Graphics processing unit
904 Memory controller
905 Display controller
906 CPU bus
907 Memory bus
909 Display

The invention claimed is:

1. A graphics processing unit which generates a graphics image by rendering a polygon according to a rendering instruction from a central processing unit, said graphics processing unit comprising:
a coordinate processing unit configured to load, from a memory, coordinate data indicating a position of each of vertices of the polygon and perform coordinate transform on the loaded coordinate data to generate transformed coordinate data, the coordinate data being included in vertex data that indicates information of the vertices of the polygon;
a determining unit configured to determine whether or not the polygon is a rendering object, using the transformed coordinate data generated by said coordinate processing unit, and, when the polygon is determined to be the rendering object, generate a vertex list indicating the vertices of the polygon;
a shape data cache for storing, for each of the vertices, shape data that is included in the vertex data and other than the coordinate data;
a shape data processing unit configured to (i) determine whether or not the shape data for each of the vertices indicated in the vertex list generated by said determining unit is stored in said shape data cache and (ii) when the shape data for each of the vertices indicated in the vertex list is not yet stored in said shape data cache, load the shape data from the memory and store the loaded shape data for each of the vertices indicated in the vertex list in said shape data cache in association with the vertices indicated in the vertex list; and
a polygon rendering processing unit configured to render the polygon using the transformed coordinate data generated by said coordinate processing unit and the shape data stored in said shape data cache,
wherein modified shape data generated by modifying the shape data is stored in said shape data cache,
wherein said shape data processing unit includes:
a shape data check unit configured to judge whether or not the modified shape data for each of the vertices indicated in the vertex list generated by said determining unit is already stored in said shape data cache;
a shape data loading unit configured to load the shape data for each of the vertices from the memory when said shape data check unit judges that the modified shape data is not yet stored; and
a shape data modifying unit configured to modify the shape data loaded by said shape data loading unit to generate the modified shape data, and store the resulting modified shape data into said shape data cache,
wherein said shape data cache includes a plurality of cache lines,
wherein each of said cache lines includes:
a cache tag indicating an ID of one of the vertices;
a line memory for storing the modified shape data for the one of the vertices indicated by said cache tag; and
a flag indicating whether or not the modified shape data stored in said line memory is valid,
wherein said shape data check unit is configured to judge, for each of said cache lines, whether or not the ID of the one of the vertices indicated in the vertex list is already stored in said cache tag corresponding to said flag indicating that the modified shape data is valid,
wherein said shape data loading unit is configured to load, for each of said cache lines, the shape data for the one of the vertices from the memory when said shape data check unit judges that the ID of the one of the vertices is not yet stored in said cache tag, and
wherein each of said cache lines includes a reference counter for counting the number of times the modified shape data stored in said line memory is referred to.

2. The graphics processing unit according to claim 1, further comprising a coordinate data cache for storing the transformed coordinate data generated by said coordinate processing unit,
wherein said determining unit is configured to determine whether or not the polygon is the rendering object, using the transformed coordinate data stored in said coordinate data cache, when the transformed coordinate data is already stored in said coordinate data cache.

3. The graphics processing unit according to claim 1, wherein the modified shape data is not stored in the memory, such that the shape data processing unit does not load the modified shape data from the memory and the shape data processing unit does not store the modified shape data to the memory.

4. The graphics processing unit according to claim 1,
wherein the modified shape data stored in said shape data cache is generated by performing, on the shape data, at least one of a calculation for obtaining a modified color value through an optical source estimation and a calculation for obtaining a modified texture coordinate value through a texture coordinate estimation.

5. The graphics processing unit according to claim 1,
wherein said shape data processing unit is configured to, when said shape data check unit judges that the modified shape data is not yet stored, store the modified shape data into said line memory of one of said cache lines whose reference counter shows 0, and set said reference counter of said cache line in which the modified shape data is stored to 1,
wherein when said shape data check unit judges that the modified shape data is stored, increment said reference counter of one of said cache lines in which the modified shape data is stored by 1, and
wherein when said polygon rendering processing unit refers to the modified shape data stored in said shape data cache, decrement a reference counter of one of said cache lines in which the modified shape data is stored by 1.

6. An image generating method used in a graphics processing unit which generates a graphics image by rendering a polygon according to a rendering instruction from a central processing unit, said image generating method comprising:
loading, from a memory, coordinate data indicating a position of each of vertices of the polygon and performing coordinate transform on the loaded coordinate data to generate transformed coordinate data, the coordinate data being included in vertex data that indicates information of the vertices of the polygon;
determining whether or not the polygon is a rendering object, using the transformed coordinate data generated by said performing of the coordinate transform, and, when the polygon is determined to be the rendering object, generating a vertex list indicating the vertices of the polygon;
storing, for each of the vertices, shape data that is included in the vertex data and other than the coordinate data, the shape data being stored in a shape data cache;
determining whether or not the shape data for each of the vertices indicated in the generated vertex list is stored in the shape data cache and, when the shape data for each of the vertices indicated in the vertex list is not yet stored in the shape data cache, loading the shape data from the memory and storing the loaded shape data for each of the vertices indicated in the vertex list in the shape data cache in association with the vertices indicated in the vertex list; and
rendering the polygon using the generated transformed coordinate data and the shape data stored in the shape data cache,
wherein modified shape data generated by modifying the shape data is stored in the shape data cache,
wherein said determining of whether or not the shape data for each of the vertices indicated in the generated vertex list is stored in the shape data cache further includes:
judging whether or not the modified shape data for each of the vertices indicated in the vertex list generated by said generating of the vertex list is already stored in the shape data cache;
loading the shape data for each of the vertices from the memory when said judging judges that the modified shape data is not yet stored; and
modifying the shape data loaded by said loading of the shape data for each of the vertices to generate the modified shape data, and storing the resulting modified shape data into the shape data cache,
wherein the shape data cache includes a plurality of cache lines,
wherein each of the cache lines includes:
a cache tag indicating an ID of one of the vertices;
a line memory for storing the modified shape data for the one of the vertices indicated by the cache tag; and
a flag indicating whether or not the modified shape data stored in the line memory is valid,
wherein said judging includes judging, for each of the cache lines, whether or not the ID of the one of the vertices indicated in the vertex list is already stored in the cache tag corresponding to the flag indicating that the modified shape data is valid,
wherein said loading includes loading, for each of the cache lines, the shape data for the one of the vertices from the memory when it is judged in said judging that the ID of the one of the vertices is not yet stored in the cache tag, and
wherein each of the cache lines includes a reference counter for counting the number of times the modified shape data stored in the line memory is referred to.

7. An image generating integrated circuit comprising:
a central processing unit; and
a graphics processing unit configured to generate a graphics image by rendering a polygon according to a rendering instruction from said central processing unit, said graphics processing unit including:
a coordinate processing unit configured to load, from a memory, coordinate data indicating a position of each of vertices of the polygon and perform coordinate transform on the loaded coordinate data to generate transformed coordinate data, the coordinate data being included in vertex data that indicates information of the vertices of the polygon;
a determining unit configured to determine whether or not the polygon is a rendering object, using the transformed coordinate data generated by said coordinate processing unit, and, when the polygon is determined to be the rendering object, generate a vertex list indicating the vertices of the polygon;
a shape data cache for storing, for each of the vertices, shape data that is included in the vertex data and other than the coordinate data;
a shape data processing unit configured to (i) determine whether or not the shape data for each of the vertices indicated in the vertex list generated by said determining unit is stored in said shape data cache and (ii) when the shape data for each of the vertices indicated in the vertex list is not yet stored in said shape data cache, load the shape data from the memory and store the loaded shape data for each of the vertices indicated in the vertex list in said shape data cache in association with the vertices indicated in the vertex list; and
a polygon rendering processing unit configured to render the polygon using the transformed coordinate data generated by said coordinate processing unit and the shape data stored in said shape data cache,
wherein modified shape data generated by modifying the shape data is stored in said shape data cache,
wherein said shape data processing unit includes:
a shape data check unit configured to judge whether or not the modified shape data for each of the vertices indicated in the vertex list generated by said determining unit is already stored in said shape data cache;
a shape data loading unit configured to load the shape data for each of the vertices from the memory when said shape data check unit judges that the modified shape data is not yet stored; and
a shape data modifying unit configured to modify the shape data loaded by said shape data loading unit to generate the modified shape data, and store the resulting modified shape data into said shape data cache, wherein said shape data cache includes a plurality of cache lines, wherein each of said cache lines includes:
a cache tag indicating an ID of one of the vertices;
a line memory for storing the modified shape data for the one of the vertices indicated by said cache tag; and
a flag indicating whether or not the modified shape data stored in said line memory is valid, wherein said shape data check unit is configured to judge, for each of said cache lines, whether or not the ID of the one of the vertices indicated in the vertex list is already stored in said cache tag corresponding to said flag indicating that the modified shape data is valid, wherein said shape data loading unit is configured to load, for each of said cache lines, the shape data for the one of the vertices from the memory when said shape data check unit judges that the ID of the one of the vertices is not yet stored in said cache tag, and wherein each of said cache lines includes a reference counter for counting the number of times the modified shape data stored in said line memory is referred to.

* * * * *